United States Patent
Gao et al.

(10) Patent No.: US 11,461,932 B2
(45) Date of Patent: Oct. 4, 2022

(54) METHOD AND APPARATUS FOR POINT CLOUD COMPRESSION

(71) Applicant: Tencent America LLC, Palo Alto, CA (US)

(72) Inventors: Wen Gao, West Windsor, NJ (US); Xiang Zhang, Sunnyvale, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 185 days.

(21) Appl. No.: 16/893,311

(22) Filed: Jun. 4, 2020

(65) Prior Publication Data
US 2020/0394822 A1 Dec. 17, 2020

Related U.S. Application Data

(60) Provisional application No. 62/860,144, filed on Jun. 11, 2019.

(51) Int. Cl.
G06T 9/00 (2006.01)
G06F 17/16 (2006.01)
G01S 17/89 (2020.01)

(52) U.S. Cl.
CPC ............... *G06T 9/00* (2013.01); *G01S 17/89* (2013.01); *G06F 17/16* (2013.01); *G06T 2207/10028* (2013.01)

(58) Field of Classification Search
CPC ...... G01S 17/08; G01S 7/4863; G01S 17/931; G01S 7/487; G02B 27/0977; H01L 31/107; H04W 28/16; H04W 72/044
(Continued)

(56) References Cited

U.S. PATENT DOCUMENTS

2014/0320492 A1 10/2014 Jiang et al.
2015/0371431 A1* 12/2015 Korb .................... G06V 30/422
382/113
(Continued)

OTHER PUBLICATIONS

Vladyslav Zakharchenko (Editor), "V-PCC Codec description", Huawei 3DG, International Organisation for Standardisation Organisation Internationale De Normalisation ISO/IEC JTC1/SC29/WG11 Coding of Moving Pictures and Audio, ISO/IEC JTC1/SC29/WG11 MPEG2019/N18190, Marrakech, MA, Jan. 2019 (38 pages).
(Continued)

*Primary Examiner* — Phuoc H Doan
(74) *Attorney, Agent, or Firm* — ArentFox Schiff LLP

(57) ABSTRACT

An apparatus for point cloud compression includes processing circuitry. The processing circuitry represents points in a point cloud using a spherical coordinate system having a first angular dimension, a second angular dimension and a radial dimension. A point is represented by a first angular coordinate in the first angular dimension, a second angular coordinate in the second angular dimension, a radial coordinate in the radial dimension and at least an attribute value. The processing circuitry forms at least a two-dimensional (2D) matrix with a first dimension corresponding to the first angular dimension and a second dimension corresponding to the second angular dimension. The point is placed as an element in the 2D matrix based on the first angular coordinate and the second angular coordinate. Further, the processing circuitry compresses data of the 2D matrix, and generates a bitstream that includes compressed data of the 2D matrix.

20 Claims, 21 Drawing Sheets

(58) Field of Classification Search
USPC .......................................... 382/232, 309, 113
See application file for complete search history.

(56) References Cited

U.S. PATENT DOCUMENTS

| | | |
|---|---|---|
| 2018/0106896 A1 | 4/2018 | Rohani et al. |
| 2018/0197329 A1* | 7/2018 | Palais .................... G06T 17/00 |
| 2019/0120946 A1 | 4/2019 | Wheeler et al. |
| 2019/0122393 A1 | 4/2019 | Sinharoy et al. |

OTHER PUBLICATIONS

Velodyne LiDAR, Inc., "Velodyne HDL-64E S3 High Definition LiDAR Senor User's Manual and Programming Guide", Dec. 2017 (54 pages).
Rufael Mekuria et al., "Requirements for Point Cloud Compression", International Organisation for Standardisation Organisation Internationale De Normalisation ISO/IEC JTC1/SC29/WG11 Coding of Moving Pictures and Audio, ISO/IEC JTC1/SC29/WG11 MPEG2016/n16330, Geneva, CH, Feb. 2016 (3 pages).
Christian Tulvan et al., "Use Cases for Point Cloud Compression (PCC)", International Organisation for Standardisation Organisation Internationale De Normalisation ISO/IEC JTC1/SC29/WG11 Coding of Moving Pictures and Audio, ISO/IEC JTC1/SC29/WG11 MPEG2015/N16331, Geneca, CH, Jun. 2016 (8 pages).
Khaled Mammou, et al., "G-PCC codec description v2", International Organisation for Standardisation Organisation Internationale De Normalisation ISO/IEC JTC1/SC29/WG11 Coding of Moving Pictures and Audio, ISO/IEC JTC1/SC29/WG11 N18189, Marrakech, MA, Jan. 2019 (40 pages).
PCT International Search Report and Written Opinion Issued in Application PCT/US2020/036601 dated Oct. 2, 2020, (18 pages).
Supplementary European Search Report dated Jul. 6, 2022 in Application No. 20821811.5, pp. 1-13.
Jae-Kyun Ahn et al: "Large-Scale 3D Point Cloud Compression Using Adaptive Radial Distance Prediction in Hybrid Coordinate Domains", IEEE Journal of Selected Topics in Signal Processing, vol. 9, No. 3, Apr. 1, 2015 (Apr. 1, 2015), pp. 422-434.

* cited by examiner

TABLE 1 - AN EXAMPLE OF A SET OF ELEVATION ANGLES FOR 32-RAY LIDAR

| Symbol | $\theta_1$ | $\theta_2$ | $\theta_3$ | $\theta_4$ | $\theta_5$ | $\theta_6$ | $\theta_7$ | $\theta_8$ |
|---|---|---|---|---|---|---|---|---|
| Value | -30.67 | -9.33 | -29.33 | -8.00 | -28.00 | -6.66 | -26.66 | -5.33 |
| Symbol | $\theta_9$ | $\theta_{10}$ | $\theta_{11}$ | $\theta_{12}$ | $\theta_{13}$ | $\theta_{14}$ | $\theta_{15}$ | $\theta_{16}$ |
| Value | -25.33 | -4.00 | -24.00 | -2.67 | -22.67 | -1.33 | -21.33 | 0.00 |
| Symbol | $\theta_{17}$ | $\theta_{18}$ | $\theta_{19}$ | $\theta_{20}$ | $\theta_{21}$ | $\theta_{22}$ | $\theta_{23}$ | $\theta_{24}$ |
| Value | -20.00 | 1.33 | -18.67 | 2.67 | -17.33 | 4.00 | -16.00 | 5.33 |
| Symbol | $\theta_{25}$ | $\theta_{26}$ | $\theta_{27}$ | $\theta_{28}$ | $\theta_{29}$ | $\theta_{30}$ | $\theta_{31}$ | $\theta_{32}$ |
| Value | -14.67 | 6.67 | -13.33 | 8.00 | -12.00 | 9.33 | -10.67 | 10.67 |

*FIG. 10*

TABLE 2: LIDAR RAW DATA FORMATE

| | $\varphi^{(1)}$ | $\varphi^{(2)}$ | ... | $\varphi^{(M)}$ |
|---|---|---|---|---|
| $\theta_1$ | $(d_{1,1}, i_{1,1})$ | $(d_{1,2}, i_{1,2})$ | ... | $(d_{1,M}, i_{1,M})$ |
| $\theta_2$ | $(d_{2,1}, i_{2,1})$ | $(d_{2,2}, i_{2,2})$ | ... | $(d_{2,M}, i_{2,M})$ |
| ... | ... | ... | ... | ... |
| $\theta_N$ | $(d_{N,1}, i_{N,1})$ | $(d_{N,2}, i_{N,2})$ | ... | $(d_{N,M}, i_{N,M})$ |

*FIG. 12*

TABLE 3: REORDERED LIDAR RAW DATA

| | $\varphi^{(1)}$ | $\varphi^{(2)}$ | ... | $\varphi^{(M)}$ |
|---|---|---|---|---|
| $\theta'_1$ | $(d'_{1,1}, i'_{1,1})$ | $(d'_{1,2}, i'_{1,2})$ | ... | $(d'_{1,M}, i'_{1,M})$ |
| $\theta'_2$ | $(d'_{2,1}, i'_{2,1})$ | $(d'_{2,2}, i'_{2,2})$ | ... | $(d'_{2,M}, i'_{2,M})$ |
| ... | ... | ... | ... | ... |
| $\theta'_N$ | $(d'_{N,1}, i'_{N,1})$ | $(d'_{N,2}, i'_{N,2})$ | ... | $(d'_{N,M}, i'_{N,M})$ |

FIG. 13

TABLE 4: CALIBRATION META DATA

| Parameter | Unit | Description | Values |
|---|---|---|---|
| rotCorrection | degree | The rotational correction angle for each laser, as viewed from the back of the sensor | Positive factors rotate to the left. Negative values rotate to the right |
| vertCorrection | degree | The vertical elevation correction angle for each laser, as viewed from the back of the sensor | Positive values have the laser pointing up. Negative values have the laser pointing down. |
| distCorrection | cm | Far distance correction of each laser distance due to the minor laser parts' variance | |
| distanceCorrectionX | cm | Close distance correction in X of each laser due to minor laser parts variances interpolated with far distance correction then applied to measurement in X | |
| distanceCorrectionY | cm | Close distance correction in Y of each laser due to minor laser parts variances interpolated with far distance correction then applied to measurement in Y | |
| verOffsetCorrection | cm | The height of each laser as measured from the bottom of the base | One fixed value for all upper block lasers. Another fixed value for all lower block lasers |
| horizOffsetCorrection | | The horizontal offset of each laser as viewed from the back of the laser | Fixed positive or negative value for all lasers |
| Maximum Intensity | | | Value from 0 to 255. Usually 255 |
| Minimum Intensity | | | Value from 0 to 255. Usually 0 |

*FIG. 20*

TABLE 5: POINT CLOUD FROM LIDAR IN A 2D MATRIX

|  | $\varphi^{(1)}$ | $\varphi^{(2)}$ | ... | $\varphi^{(M)}$ |
|---|---|---|---|---|
| $\theta_1$ | $(\delta\theta_{1,1}, \delta\varphi_{1,1}, d'_{1,1}, i'_{1,1})$ | $(\delta\theta_{1,2}, \delta\varphi_{1,2}, d'_{1,2}, i'_{1,2})$ | ... | $(\delta\theta_{1,M}, \delta\varphi_{1,M}, d'_{1,M}, i'_{1,M})$ |
| $\theta_2$ | $(\delta\theta_{2,1}, \delta\varphi_{1,1}, d'_{2,1}, i'_{2,1})$ | $(\delta\theta_{2,2}, \delta\varphi_{2,2}, d'_{2,2}, i'_{2,2})$ | ... | $(\delta\theta_{2,M}, \delta\varphi_{2,M}, d'_{2,M}, i'_{2,M})$ |
| ... | ... | ... | ... | ... |
| $\theta_N$ | $(\delta\theta_{N,1}, \delta\varphi_{N,1}, d'_{N,1}, i'_{N,1})$ | $(\delta\theta_{N,2}, \delta\varphi_{N,2}, d'_{N,2}, i'_{N,2})$ | ... | $(\delta\theta_{N,M}, \delta\varphi_{N,M}, d'_{N,M}, i'_{N,M})$ |

FIG. 21

METHOD AND APPARATUS FOR POINT CLOUD COMPRESSION

INCORPORATION BY REFERENCE

This present application claims the benefit of priority to U.S. Provisional Application No. 62/860,144, "POINT CLOUD CODING USING RAW LIDAR DATA" filed on Jun. 11, 2019, which is incorporated by reference herein in its entirety.

TECHNICAL FIELD

The present disclosure describes embodiments generally related to point cloud compression.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent world, such as objects in the world, environments in the world, and the like in 3-dimensional (3D) space. 3D representations of the world can enable more immersive forms of interaction and communication. Point clouds can be used as 3D representation of the world. A point cloud is a set of points in a 3D space, each with associated attributes, e.g. color, material properties, texture information, intensity attributes, reflectivity attributes, motion related attributes, modality attributes, and various other attributes. Such point clouds may include large amounts of data and may be costly and time-consuming to store and transmit.

SUMMARY

Aspects of the disclosure provide methods and apparatuses for point cloud compression and decompression. In some examples, an apparatus for point cloud compression/decompression includes processing circuitry. For example, processing circuitry represents points in a point cloud using a spherical coordinate system having a first angular dimension, a second angular dimension and a radial dimension. A point is represented by a first angular coordinate in the first angular dimension, a second angular coordinate in the second angular dimension, a radial coordinate in the radial dimension and at least an attribute value. The processing circuitry forms at least a two-dimensional (2D) matrix with a first dimension corresponding to the first angular dimension and a second dimension corresponding to the second angular dimension. The point is placed as an element in the 2D matrix based on the first angular coordinate and the second angular coordinate. Further, the processing circuitry compresses data of the 2D matrix, and generates a bitstream that includes compressed data of the 2D matrix.

According to an aspect of the disclosure, the processing circuitry receives distances and intensities that are sensed by a light detection and ranging (Lidar) sensor based on lasers that are disposed at elevation angles and rotate to rotation angles with time. A distance and an intensity are sensed in response to a ray emitted by a laser disposed at an elevation angle and at a time having a rotation angle. The processing circuitry represents the point by the rotation angle in the first angular dimension, the elevation angle in the second angular dimension, the distance in the radial dimension and the intensity is the attribute value. Further, the processing circuitry places the point as the element in the 2D matrix based on the rotation angle and the elevation angle. The processing circuitry can convert the 2D matrix to one or more images, and compress the one or more images.

In some embodiments, the processing circuitry converts the 2D matrix to a first 2D image and a second 2D image, the first 2D image has pixel values corresponding to distances of points in the 2D matrix, the second 2D image has pixel values corresponding to intensities of the points in the 2D matrix. The processing circuitry then compresses the first 2D image and the second 2D image.

In some embodiments, the processing circuitry converts the 2D matrix to a 2D image with a pixel in the 2D image corresponding to the point. The pixel has a pixel color with the distance of the point being a first color component, and with the intensity of the point being a second color component. Then, the processing circuitry compresses the 2D image.

In an embodiment, the 2D matrix is a first frame of 2D matrix corresponding to a full rotation, and the processing circuitry forms at least a second frame of 2D matrix corresponding to another full rotation with a temporal difference to the first frame. The processing circuitry can stack the at least second frame of 2D matrix with the first frame of 2D matrix into a multi frame matrix, and then convert the multi frame matrix to one or more images and compress the one or more images.

In some examples, the processing circuitry forms a sequence of frames of 2D matrix that respectively correspond to different time, generates, from the sequence of frames, a sequence of images that respectively correspond to the different time, and compress the sequence of images respectively based on image compression.

In some other examples, the processing circuitry forms a sequence of frames of 2D matrix that respectively correspond to different time, generate, from the sequence of frames, a sequence of images that respectively correspond to the different time and compress the sequence of images based on video compression.

In some embodiments, the processing circuitry generates a first bistream including compressed data for the one or more images, generates a second bitstream including compressed calibration and motion compensation for the Lidar sensor, and combines the first bitstream and the second bitstream into a combined bitstream.

In some embodiments, the processing circuitry can modify points in the 2D matrix based on calibration and motion compensation. A modified point in the 2D matrix includes a rotation angle adjustment, an elevation angle adjustment, a modified distance and a modified intensity. Then the processing circuitry converts the 2D matrix to one or more images; and compresses the one or more images.

According to some other aspects of the disclosure, processing circuitry for point cloud construction can partition a received bistream, corresponding to a point cloud sensed by a light detection and ranging (Lidar) sensor, into a first bistream corresponding to data sensed by the Lidar sensor, and a second bitstream corresponding to meta data including at least calibration and motion compensation information for the Lidar sensor. The processing circuitry can decompress the first bitstream to obtain distances and intensities that are sensed by the Lidar sensor based on lasers that are disposed at elevation angles and rotate to rotation angles with time. A distance and an intensity are sensed in response to a ray emitted by a laser disposed at an elevation angle and at a time having a rotation angle. The processing circuitry can decompress the second bitstream to obtain the meta data including at least the calibration and motion compensation information for the Lidar sensor. Then, the processing circuitry can construct a final point cloud based on the distances and intensities sensed with the elevation angles and the rotation angles, and the meta data including at least the calibration and the motion compensation.

Aspects of the disclosure also provide a non-transitory computer-readable medium storing instructions which when executed by a computer for point cloud compression/decompression cause the computer to perform the method for point cloud compression/decompression.

BRIEF DESCRIPTION OF THE DRAWINGS

Further features, the nature, and various advantages of the disclosed subject matter will be more apparent from the following detailed description and the accompanying drawings in which:

FIG. 10 shows Table 1 of elevation angles for a 32-ray Lidar sensor in an example.

FIG. 12 shows Table 2 for Lidar raw data in the form of a 2-D matrix.

FIG. 13 shows Table 3 of reordered Lidar raw in a 2D matrix.

FIG. 20 shows Table 4 for an example set of calibration meta data.

FIG. 21 shows Table 5 in 2D matrix according to some examples.

DETAILED DESCRIPTION OF EMBODIMENTS

Figure 1:
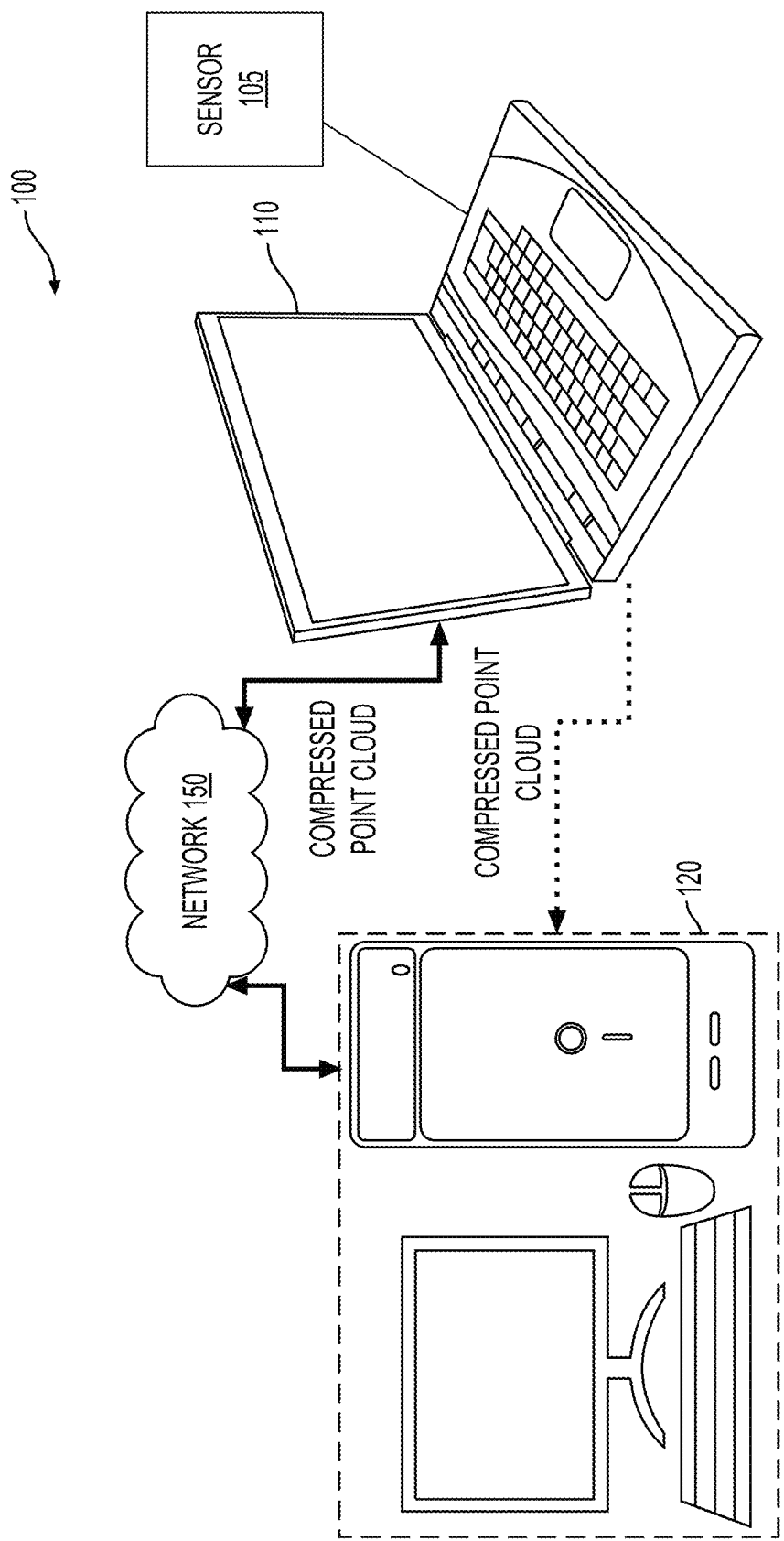
FIG. 1 is a schematic illustration of a simplified block diagram of a communication system (100) in accordance with an embodiment.

Aspects of the disclosure provide point cloud coding (PCC) techniques. PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. Moving picture experts group (MPEG) is working on G-PCC standard and V-PCC standard that respectively using the G-PCC scheme and the V-PCC scheme. The present disclosure provides techniques that can use three dimensional (3D) polar coordinate system (also referred to as spherical coordinate system) in point cloud coding. For example, in light detection and ranging (Lidar) applications, 3D polar coordinate system can be used for point cloud compression of raw Lidar data and some additional meta data information.

Generally, a point cloud may refer to a set of points in a 3D space, each with associated attributes, e.g. color, material properties, texture information, intensity attributes, reflectivity attributes, motion related attributes, modality attributes, and various other attributes. Point clouds can be used to reconstruct an object or a scene as a composition of such points. The points can be captured using multiple cameras and depth sensors in various setups and may be made up of thousands up to billions of points in order to realistically represent reconstructed scenes. A patch generally may refer to a contiguous subset of the surface described by the point cloud. In an example, a patch includes points with surface normal vectors that deviate from one another less than a threshold amount.

Compression technologies are needed to reduce the amount of data required to represent a point cloud. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, and the like. Moving picture experts group (MPEG) starts working on a standard to address compression of geometry and attributes such as colors and reflectance, scalable/progressive coding, coding of sequences of point clouds captured over time, and random access to subsets of the point cloud.

According to an aspect of the disclosure, the main philosophy behind V-PCC is to leverage existing video codecs to compress the geometry, occupancy, and texture of a dynamic point cloud as three separate video sequences. The extra metadata needed to interpret the three video sequences are compressed separately. A small portion of the overall bitstream is the metadata, which could be encoded/decoded efficiently using software implementation. The bulk of the information is handled by the video codec.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) that perform unidirectional transmission of point cloud data. For example, the terminal device (110) may compress point cloud (e.g., points representing a structure) that are captured by a sensor 105 connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud and suitably display according to the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
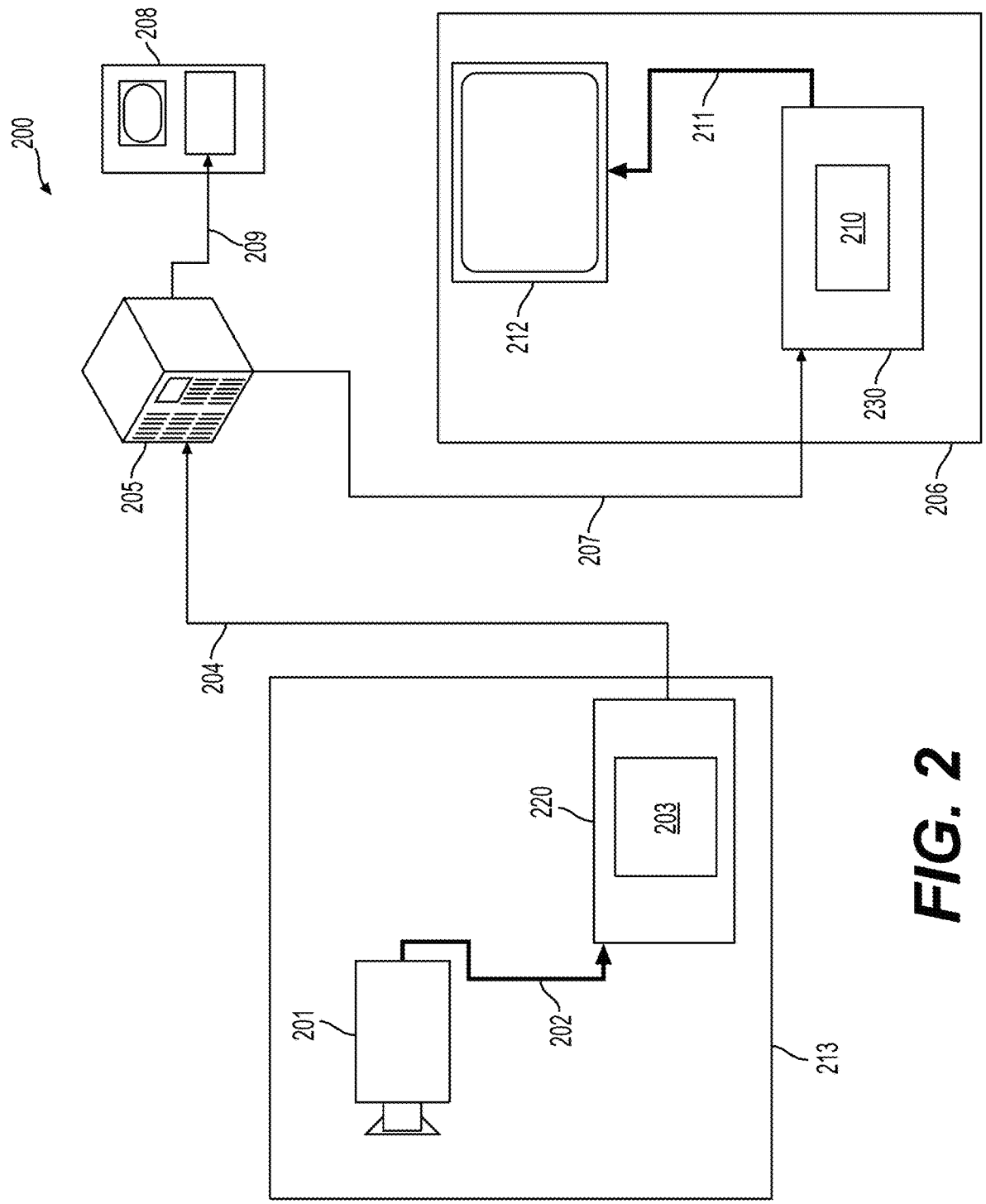
FIG. 2 is a schematic illustration of a simplified block diagram of a streaming system (200) in accordance with an embodiment.

FIG. 2 illustrates, as an example for an application for the disclosed subject matter for point cloud. The disclosed subject matter can be equally applicable to other point cloud enabled applications, including, 3D telepresence application, virtual reality application.

A streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212). In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

It is noted that the electronic devices (220) and (230) can include other components (not shown). For example, the electronic device (220) can include a decoder (not shown) and the electronic device (230) can include an encoder (not shown) as well.

Figure 3:
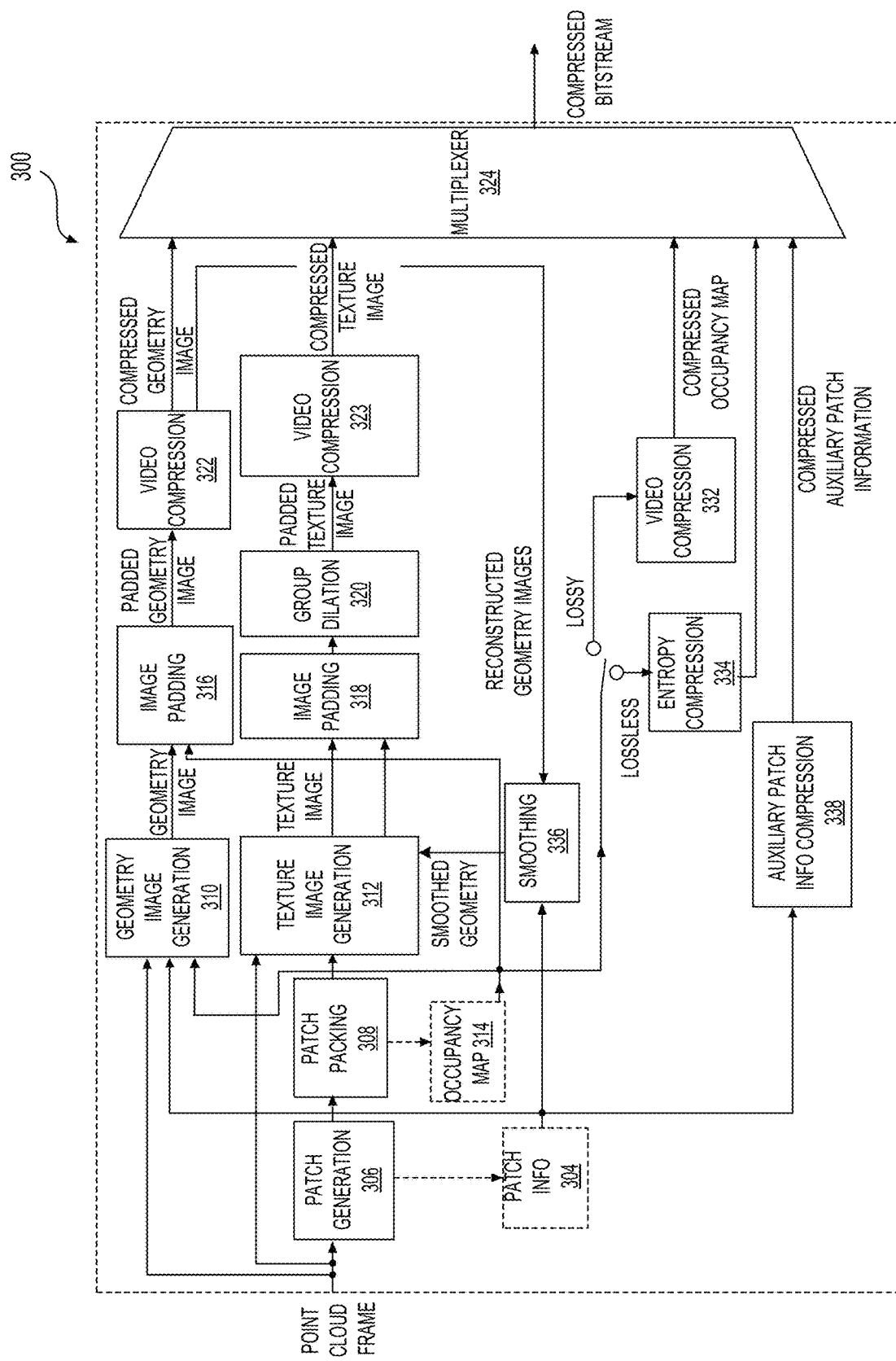
FIG. 3 shows a block diagram of an encoder (300) for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames that are uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334) and a multiplexer (324) coupled together as shown in FIG. 3.

According to an aspect of the disclosure, the V-PCC encoder (300), converts 3D point cloud frames into an image-based representation along with some meta data (e.g., occupancy map and patch info) necessary to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels and a pixel filled with texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes of a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map; when lossy coding is used, the video compression module (332) is used to compress the occupancy map.

It is noted that the patch packing module (308) may leave some empty spaces between 2D patches packed in an image frame. The image padding module (316) and (318) can fill the empty spaces (referred to as padding) in order to generate an image frame that may be suited for 2D video and image codecs. The image padding is also referred to as background filling which can fill the unused space by redundant information. In some examples, a good background filling minimally increases the bit rate while does not introduce significant coding distortion around the patch boundaries.

The video compression modules (322), (323) and (332) can encode the 2D images, such as the padded geometry images, padded texture images, and occupancy maps based on a suitable video coding standard, such as HEVC, VVC and the like. In an example, the video compression modules (322), (323) and (332) are individual components that operate separately. It is noted that the video compression modules (322), (323) and (332) can be implemented as a single component in another example.

In some examples, the smoothing module (336) is configured to generate a smoothed image of the reconstructed geometry image. The smoothed image information can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
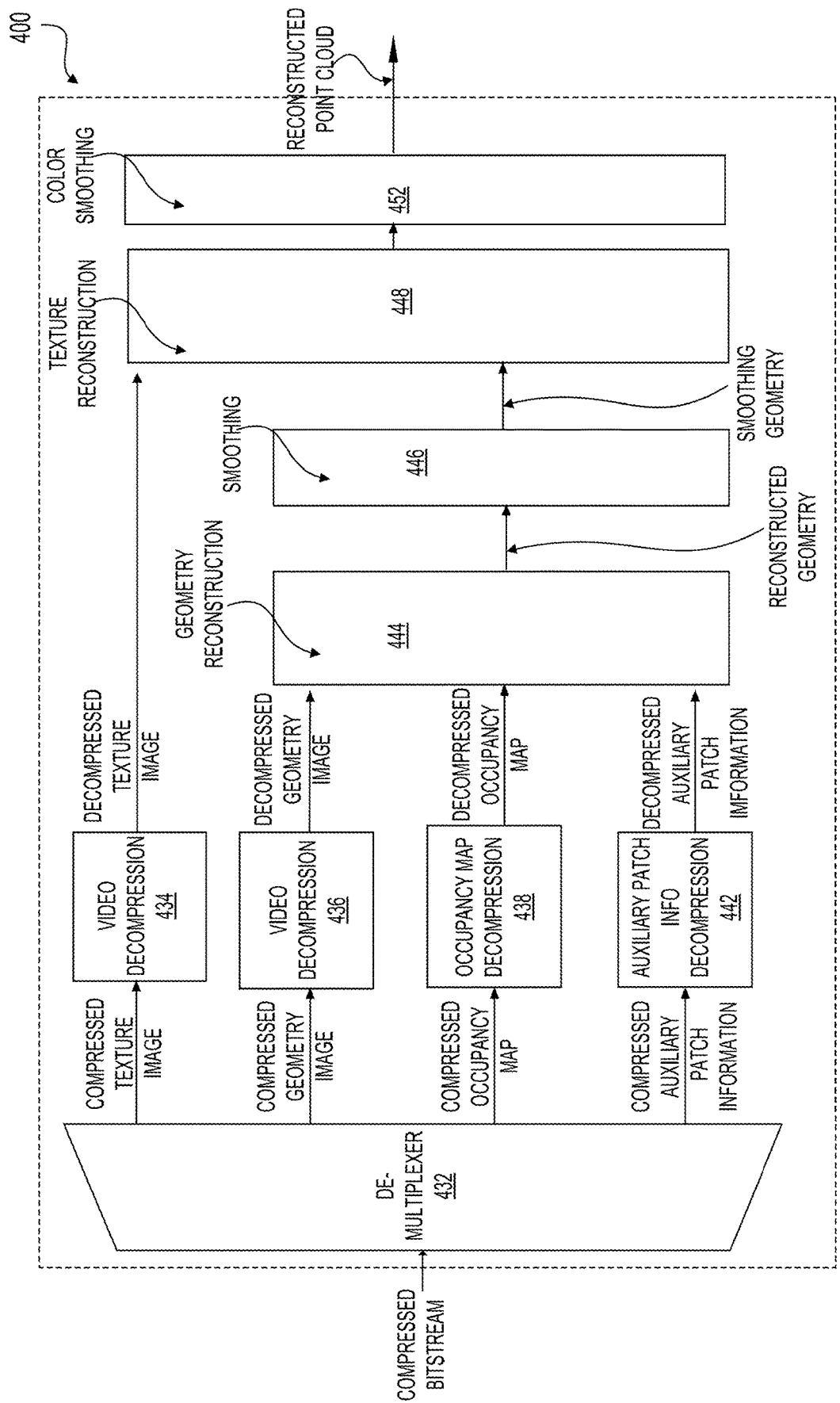
FIG. 4 shows a block diagram of a decoder for decoding a compressed bitstream corresponding to point cloud frames according to some embodiments.

FIG. 4 shows a block diagram of a V-PCC decoder (400) for decoding compressed bitstream corresponding to point cloud frames, according to some embodiments. In some embodiments, the V-PCC decoder (400) can be used in the communication system (100) and streaming system (200). For example, the decoder (210) can be configured and operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448) and a color smoothing module (452) coupled together as shown in FIG. 4.

The de-multiplexer (432) can receive the compressed bitstream and separate into compressed texture image, compressed geometry image, compressed occupancy map and compressed auxiliary patch information.

The video decompression modules (434) and (436) can decode the compressed images according to suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to suitable standard (e.g., HEVC, VVC, etc.) and output decompressed occupancy maps.

The auxiliary patch-information decompression module (442) can decode the compressed auxiliary patch information according to suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
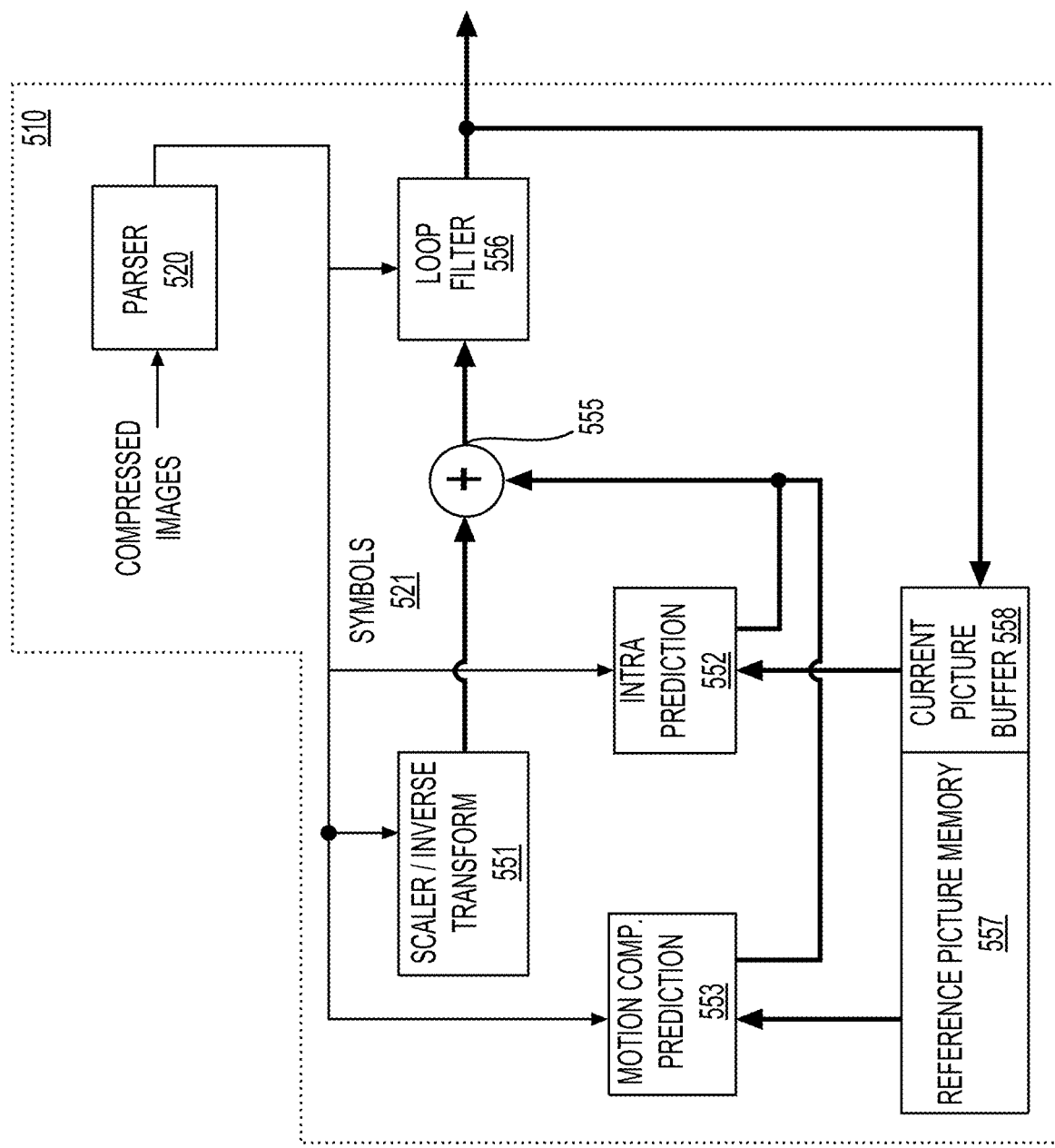
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
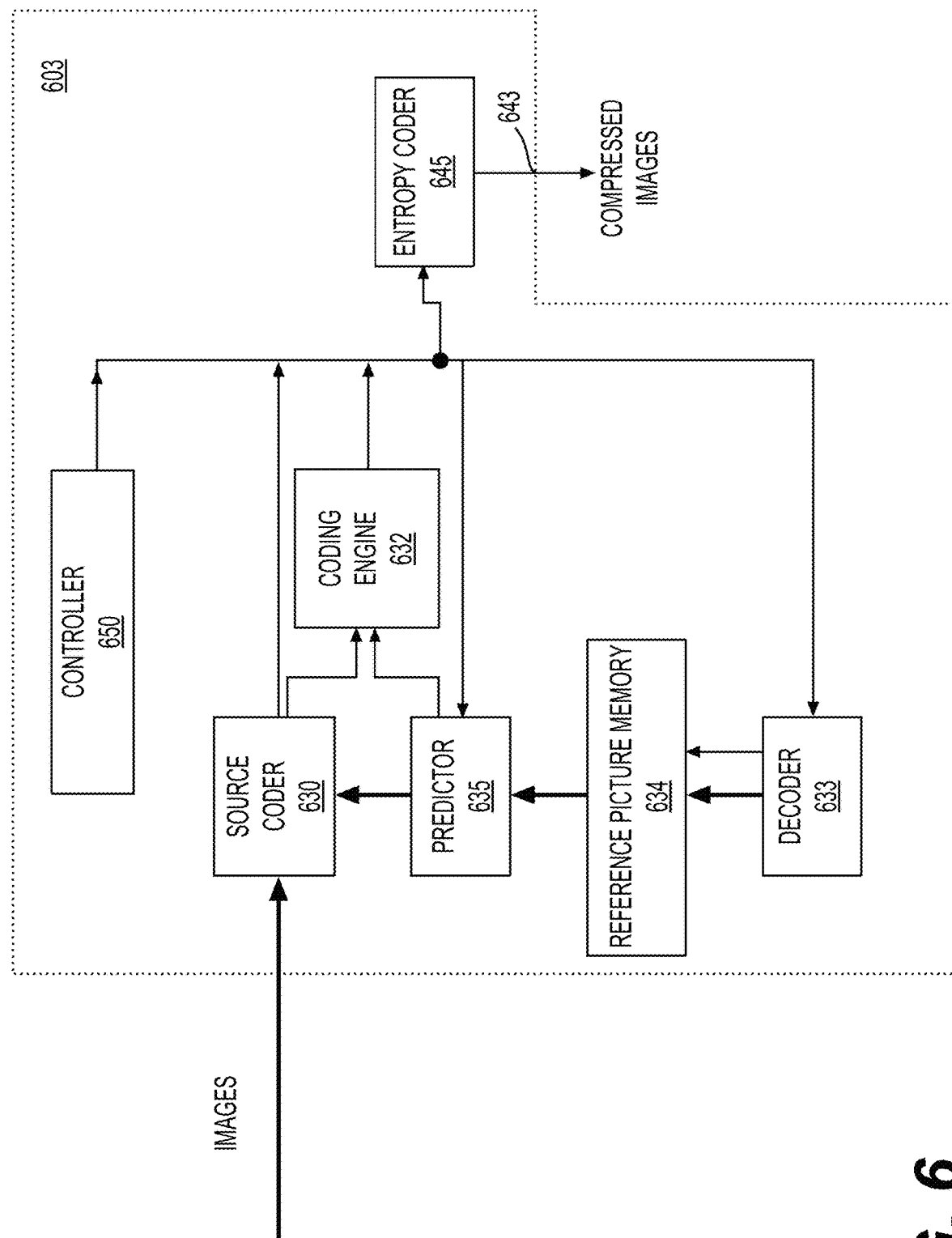
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) the compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Point cloud coding (PCC) can be widely used in various applications. For example, PCC can be used in autonomous driving for object detection and localization. In another example, PCC can be used in geographic information systems (GIS) for mapping, and can be used in cultural heritage to visualize and archive cultural heritage objects and collections, etc.

As described above, point clouds contain a set of three dimensional (3D) points each including 3D position information and additional attributes such as color, reflectance, and the like. In an example, a point cloud can be captured using multiple cameras and depth sensors. In another example, a point cloud can be captured using Lidar in various setups. A point cloud can be made up of thousands up to billions of points in order to realistically represent the original scenes. Compression technologies are needed to reduce the amount of data required to represent a point cloud for faster transmission or reduction of storage.

In some examples, Cartesian coordinate system can be used in PPC. For example, a point in a point cloud can be represented by 3D Cartesian coordinate (x, y, z) and the associated attribute vector ($a_1, \ldots, a_N$), and N is the dimension of attribute vector and can be any suitable integer. In an example, N is four. For example, $a_1, a_2, a_3$ can be color information, such as in R, G, B color coding system or in Y, U, V color coding system, and a4 can be reflectance.

In some examples, point clouds are captured by Lidar. The associated attribute vector only contains reflectance and no color information and hence N is 1, $a_1$ is the reflectance of the point.

In some embodiments, the 3D coordinate and the attribute vector can be combined. For example, a vector (x, y, z, $a_1, \ldots, a_N$) can be used to carry all information related to a point in a point cloud.

Two types of tree structures that are referred to as K-D tree and octree, can be used for point cloud compression. In an example, points in the point cloud are represented using combined vector of 3D coordinate vector and the attribute vector, such as in the form of (x, y, z, $a_1, \ldots, a_N$). Based on the combined vector, a K-D tree is constructed, and compressed.

In another example, octree can be constructed based on the 3D Cartesian coordinates (x, y, z) and compressed. Then, the attribute vectors are compressed separately from the octree by utilizing the corresponding geometry neighboring information.

K-D tree based point cloud compression is relatively simple. On the other hand, octree based method is often complex due to irregularity of the points in 3D space and octree method needs traverse the whole 3D bounding box enclosing the point cloud. In addition, the attribute vectors need compressed separately after the 3D coordinates are compressed and reconstructed.

Some aspects of the present disclosure provide methods for using 3D polar coordinate system in point cloud coding. Using 3D polar coordinate system can simplify PCC and improve coding efficiency for certain applications, such as Lidar. It is noted that Lidar is used in the following description as an example for using 3D polar coordinate system in PCC, and the 3D polar coordinate system can be used in other applications of PCC.

Figure 7:
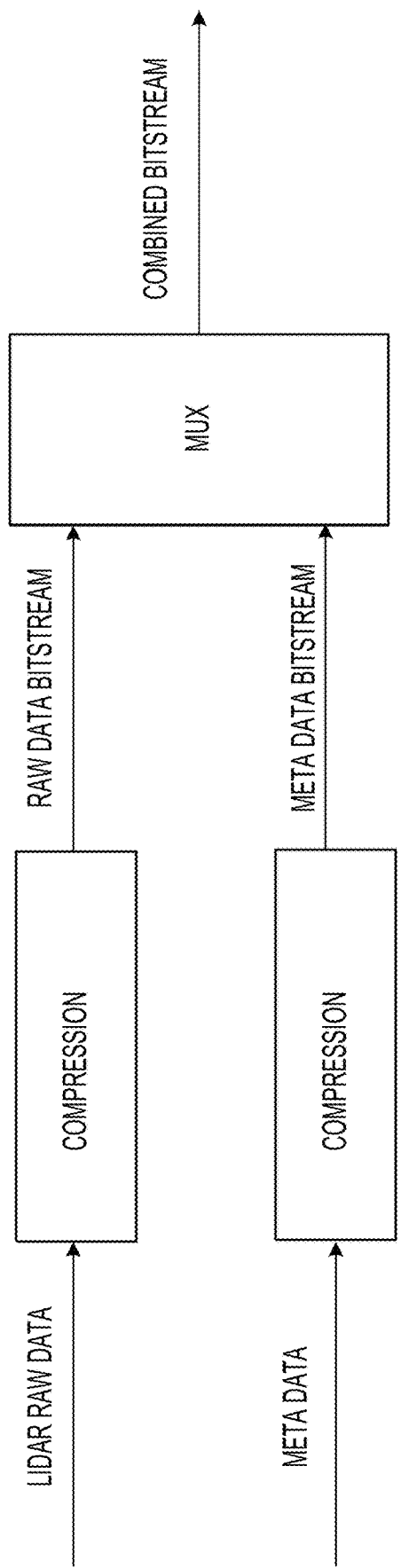
FIG. 7 shows a diagram of a compression process of a point cloud according to some embodiments of the disclosure.

FIG. 7 shows a diagram of a compression process of a point cloud generated by Lidar according to some embodiments of the disclosure. In the FIG. 7 example, the raw data generated by Lidar is compressed and all the necessary meta data information used to convert the raw data to the final point cloud is compressed separately from the raw data. For example, the Lidar raw data is compressed to generate raw data bitstream, the meta data is compressed to generate meta data bitstream. Then, the raw data bitstream and the meta data bitstream are combined, such as multiplexed to generate the combined bitstream. The compression process in FIG. 7 differs from a related example that convers the Lidar raw data to a final point cloud based on meta data, and then compresses the final point cloud.

Figure 8:
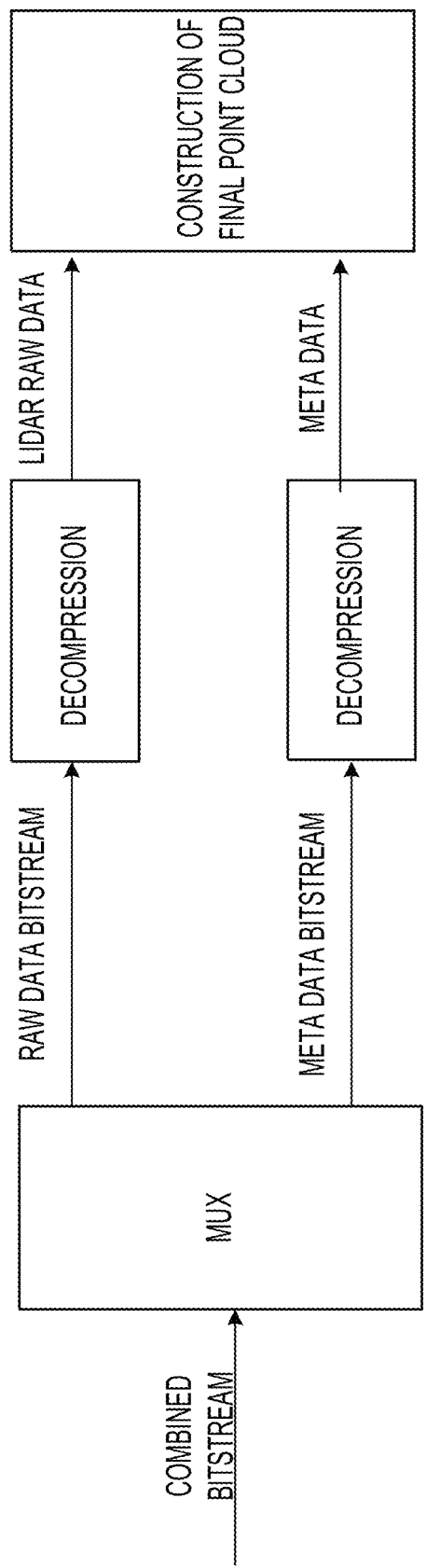
FIG. 8 shows a diagram of a decompression process.

FIG. 8 shows a diagram of a decompression process for the combined bitstream generated according to FIG. 7. The combined bitstream is de-multiplexed into a raw data bitstream and a meta data bitstream. The raw data stream can be decompressed to reconstruct the Lidar raw data, and the meta data bitstream can be decompressed to reconstruct the meta data. Then, the Lidar raw data is converted to the final point cloud based on the meta data in the FIG. 8 example.

In some embodiments, Lidar raw data is collected in 3D polar coordinate system. Thus, in some embodiments, Lidar data compression, decompression and construction of final point cloud can be performed in 3D polar coordinate system. Lidar raw data, the associated meta data, and the processing module, such as compression, decompression, and construction of final point cloud are described in details in the following description.

According to an aspect of the disclosure, Lidar raw data is collected by Lidar sensor(s). A Lidar sensor can include one or more laser devices which emit laser pulses, one or more reception device which detect returned pulses from object surface for ranging, a scanning device which may be a rotating mirror or a platform that rotate laser and reception devices together to allow scanning of the surrounding environment of the sensor.

A Lidar sensor usually sends multiple laser pulses (rays), e.g., 16 rays, 32 rays, or 64 rays, etc, at a given rotation angle phi ($\varphi$).

Figure 9:
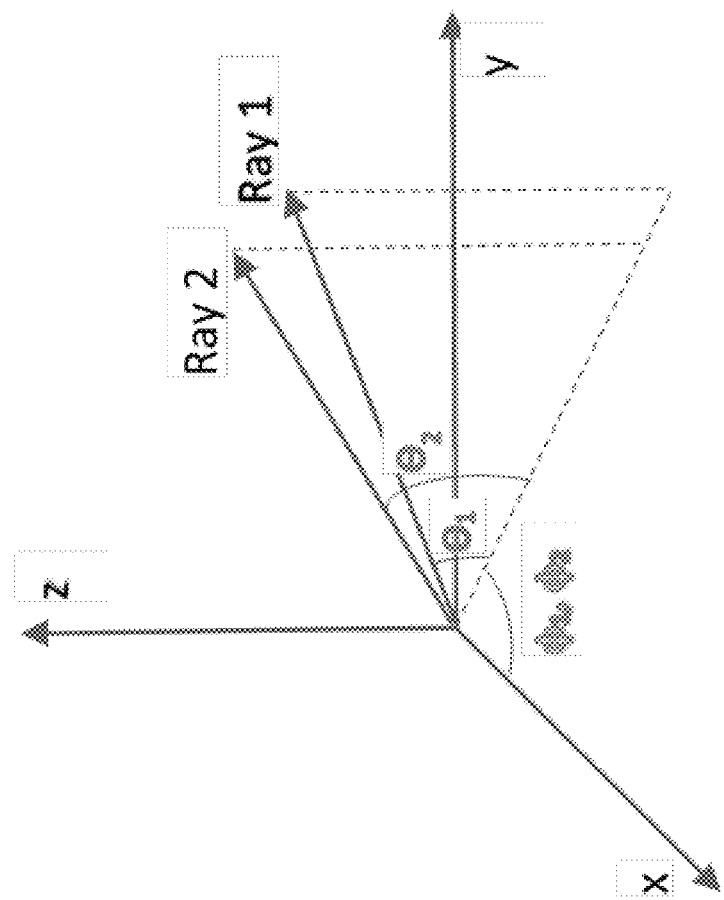
FIG. 9 shows a light detection and ranging (Lidar) example using two rays according to some embodiments of the disclosure.

FIG. 9 shows an Lidar example using two rays according to some embodiments of the disclosure. While two rays are used, the concept in FIG. 9 can be extended to any suitable number of rays.

In the FIG. 9 example, $\theta_1$ and $\theta_1$ represent the elevation angle and $\varphi_1$ and $\varphi_2$ represent the rotation angles respectively for the corresponding two laser rays. Without loss of generality, $\varphi_1$ and $\varphi_2$ are assumed equal. In reality, $\varphi_1$ and $\varphi_2$ may be slightly different but the difference can be fixed and can be corrected at the time the final point cloud is generated from the Lidar raw data, which will be described with reference to calibration.

In some examples, for an N-ray Lidar (N is a positive integer), a set of elevation angles for the N rays can be denoted as [$\theta_1, \theta_2, \ldots, \theta_N$], and a set of rotation angles for the N rays can be denoted as [$\varphi_1, \varphi_2, \ldots, \varphi_N$].

FIG. 10 shows Table 1 of elevation angles for a 32-ray Lidar sensor in an example. Without loss of generality, rotation angles are assumed to be equal: $\varphi_1=\varphi_2=\ldots=\varphi_N=\varphi$. For a laser ray with elevation angle $\theta$ at a given rotation angle $\varphi$, the Lidar measures the distance of a 3D point in surface of a remote object where the pulse is bounced back to the detector of the Lidar. Meanwhile the intensity of the return pulse is measured and the measured intensity is used to indicate the reflectance of the surface of the remote object.

Figure 11:
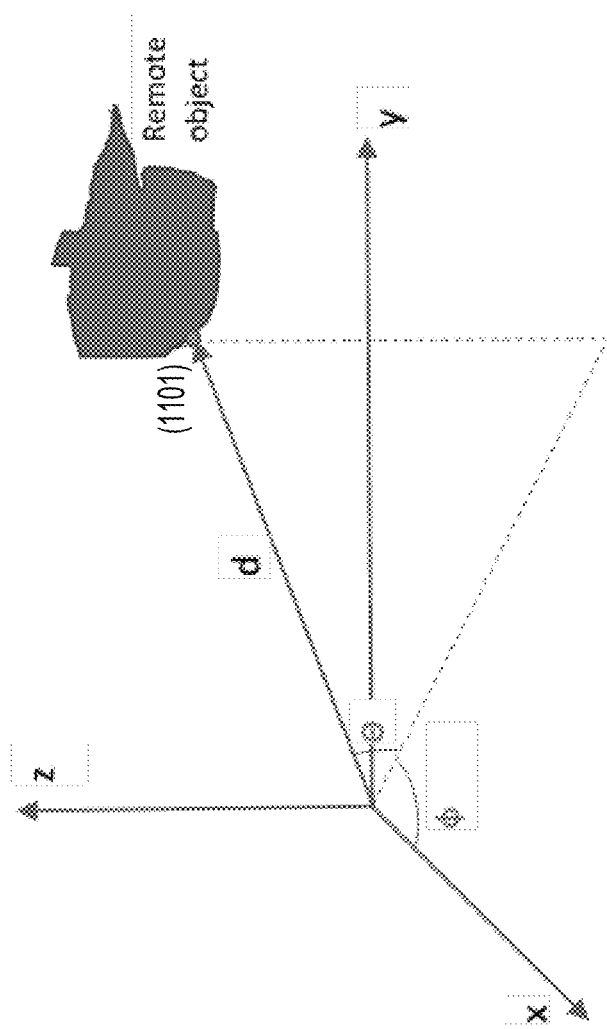
FIG. 11 shows an example for measuring distance and reflectance of a 3D point using a laser ray.

FIG. 11 shows an example for measuring distance and reflectance of a 3D point using a laser ray. FIG. 11 shows a 3D point (1101) of a remote object in a 3D polar coordinate system. The 3D point (1101) has polar coordinates (d, $\varphi$, $\theta$) and attribute (i), where d denotes the distance and i denotes the intensity that can be measured by Lidar.

In general, for a whole 360 degree scan, a Lidar sensor may send laser pulses at a set of M discrete time, corresponding different rotation angles denoted as [$\varphi^{(1)}, \varphi^{(2)}, \ldots, \varphi^{(M)}$] for continuously scanning laser. In some examples, the raw laser data can be represented using a 2-D matrix.

FIG. 12 shows Table 2 for Lidar raw data in the form of a 2-D matrix with dimension N×M, where N denotes the number of laser rays and M denotes the number of discrete time for sending laser pulses.

In some examples, the Lidar raw data of 2D matrix as shown FIG. 12 corresponds to a whole 360 degree scan, and is referred to as one frame of Lidar raw data. When a Lidar sensor continuously scans surrounding environment, multiple frames of Lidar raw data can be generated.

It is noted that Lidar sensors from different manufactures may have different property regarding the set of rotation angles, i.e., [$\varphi^{(1)}, \varphi^{(2)}, \ldots, \varphi^{(M)}$]. In some examples, for some Lidar sensors, the set of rotation angles is the same for all frames, thus the set of rotation angles can be sent once as meta data in the meta data bitstream. In some examples, for some Lidar sensors, the set of rotation angles may not be exactly same for different frames, thus the set of rotation angels may need to be carried in the raw data bitstream for each frame.

It is noted that, in some embodiments, since the set of elevation angles [$\theta_1$, $\theta_2$, . . . , $\theta_N$] are the same for each frame, thus the set of elevation angels can be sent once as meta data in the metal data bitsteam.

While the Lidar raw data can be collected in 3D polar coordinate system, some aspects of the disclosure provide techniques to compress the Lidar raw data in the 3D polar coordinate system. The compression process of Lidar raw data can include preprocessing of Lidar raw data, compression of distance and intensity information, and compression of rotation angles, that will be described respectively.

In some embodiments, before the compression of the Lidar raw data, some preprocessing steps can be done to help improving the efficiency of the later compression steps. In some embodiments, the preprocessing steps can include one or more of a reshaping step, a thresholding step, a log scale step, and a stacking of multiple frames step.

In an embodiment, the elevation angles are not ordered in the Lidar raw data. In the preprocessing, the rows of the 2D Lidar raw data matrix can be swapped, such that the elevation angles are ordered in certain order, such as an increasing order, a decreasing order, and the like. The swap operations are referred to as a reshaping step. Neighboring rows in certain order have higher probability to have closer vector values, thus compression efficiency can be improved.

FIG. 13 shows Table 3 of reordered Lidar raw in a 2D matrix. The 2D matrix has a dimension of N×M. In an example, the rows of the 2D Lidar raw data are swapped to order the elevation angles in an increasing order. Thus, the set of elevation angles [$\theta_1$, $\theta_2$, . . . , $\theta_N$] in FIG. 12 becomes [$\theta'_1$, $\theta'_2$, . . . , $\theta'_N$], where $\theta'_1 < \theta'_2 < \ldots < \theta'_N$. It is noted that at the time of row swap, the corresponding distance and intensity values are swapped together with the elevation angles. The swapped values are denoted as {($d'_{n,m}$, $i'_{n,m}$)} for n=1, . . . , N and m=1, . . . , M.

In some embodiments, since the distance measurement from Lidar sensor is not reliable for small distance or for large distance, two thresholds, such as DistanceThresh$_{low}$ and DistanceThresh$_{high}$ can be setup. For a distance $d_{n,m}$ (n=1, . . . , N and m=1, . . . , M) if $d_{n,m}$<DistanceThresh$_{low}$ or $d_{n,m}$>DistanceThresh$_{high}$, the distance $d_{n,m}$ can be set to a specific value, such as "0", which indicates that this point can be ignored. Similarly, the corresponding intensity information $i_{n,m}$ can be set to a specific value, such as 0. In an example, the threshold values DistanceThresh$_{low}$=0.9 m and DistanceThresh$_{high}$=120 m. This step is referred to as a thresholding step.

In some embodiments, when dynamic range of the distance information is too large, log scale can be used to represent the distance information. For example, variable $\hat{d}_{n,m}$ is used to denote the log scale of the distance, and variable y is an intermediate variable. The log scale of the distance can be calculated as $$y = C1 \times \log 10\left(\frac{d_{n,m}}{C2}\right), \hat{d}_{n,m} = \text{sign}(y) \times \text{int}(|y|+0.5),$$

where C1, C2 are two positive constants and int (a) is an operation to take the integer part of a and sign(b) is an operation to take the sign value of b. For example, sign(b)=1 if b>=0 sign(b)=−1 if b<0. This step is referred to as log scale step.

In some embodiments, instead of treating each frame separately, multiple frames of Lidar raw data can be combined before compression. For example, multiple Lidar raw data matrices can be stacked vertically to form a large 2-D matrix with a dimension of (kN)×M where k is number of frames that stack together. This step is referred to as a stacking of multiple frames step.

It is noted that, in some examples, only one of the above preprocessing steps (the reshaping step, the thresholding step, the log scale step, and the stacking of multiple frames step) is used. In some other examples, two or three steps from the above steps are used together. In some other examples, all of the four steps are utilized.

According to an aspect of the disclosure, after the preprocessing steps, distance and intensity Information can be compressed. Using Table 2 FIG. 12 as an example, each Lidar raw data frame is represented as a 2D matrix and can be treated as a 2D image.

In some embodiments, each Lidar raw data frame is treated as two separate monochrome images: one is the distance image, denoted as {$d_{n,m}$} for n=1, . . . , N and m=1, . . . , M; the other is the intensity image, denoted as for n=1, . . . , N and m=1, . . . , M.

Figure 14:
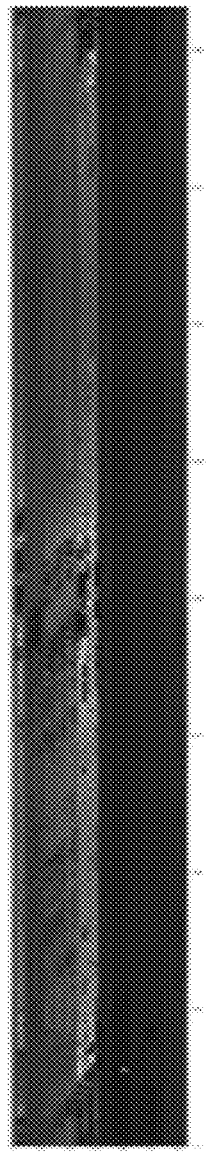
FIG. 14 shows a portion of a distance image
Figure 15:
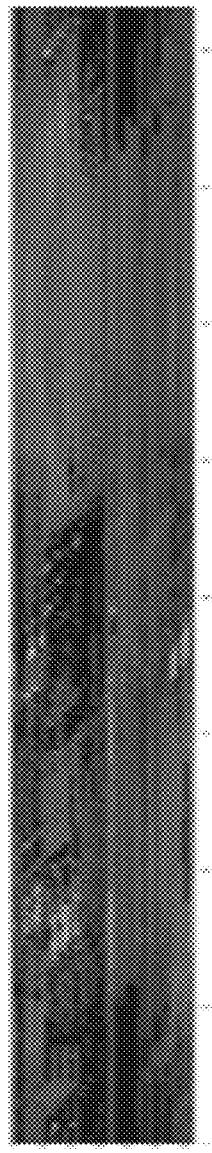
FIG. 15 shows a portion of an intensity image

FIG. 14 shows a portion of a distance image of size N=64 and M=2080 and FIG. 15 shows a portion of an intensity image of size N=64 and M=2080 in an example. In FIG. 14 and FIG. 15, brightness is used to indicate the pixel values. For example, bright color indicates large value and dark color indicates small value. It is noted that since M is much larger than N, the distance image and the intensity image are quite narrow, thus FIG. 14 and FIG. 15 show some portions of the distance image and the intensity image.

Figure 16:
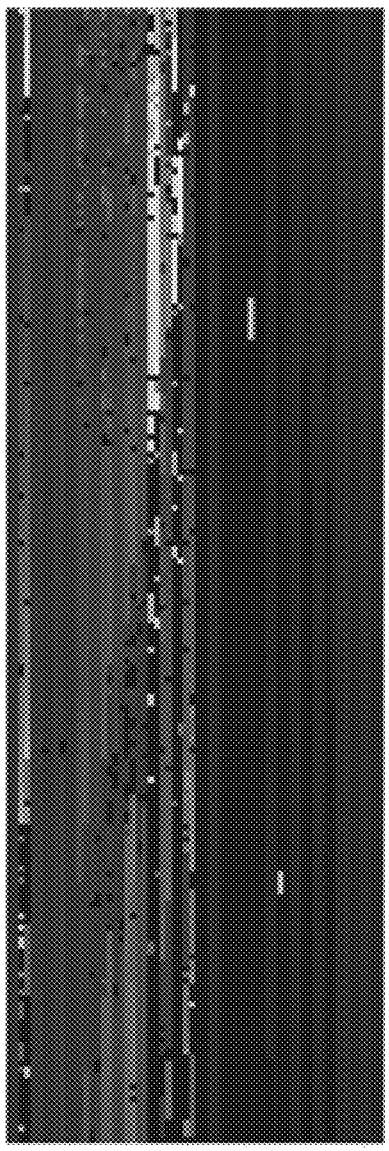
FIG. 16 shows a portion of a distance image
Figure 17:
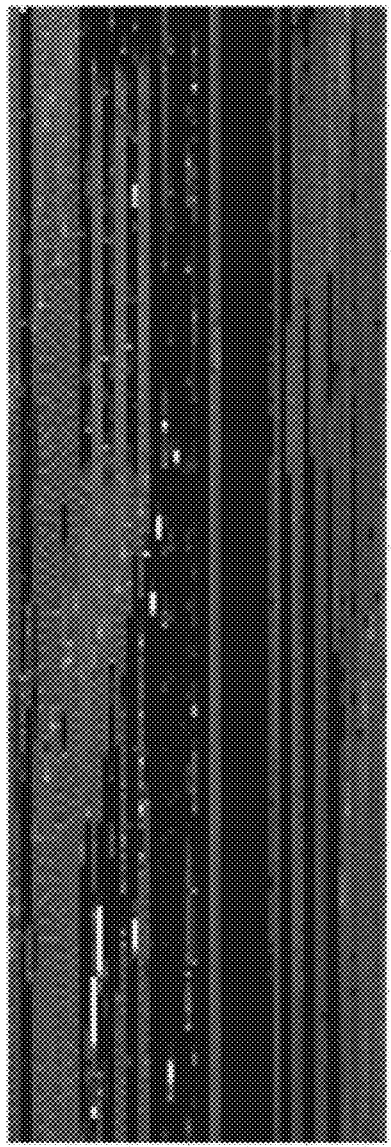
FIG. 17 shows a portion of an intensity image

FIG. 16 shows a zoom-in portion of the distance image with N=0, . . . , 64 and M=0, . . . , 191, and FIG. 17 shows a zoom-in portion of the intensity image with N=0, . . . , 64 and M=0, . . . , 191.

In some embodiments, multiple consecutive frames can be vertically stacked to form larger distance images and intensity images.

Figure 18:
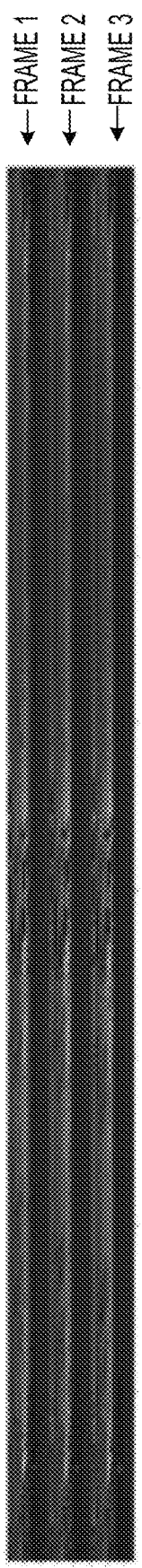
FIG. 18 shows a distance image of a larger frame that is formed of stacking three consecutive frames vertically.
Figure 19:
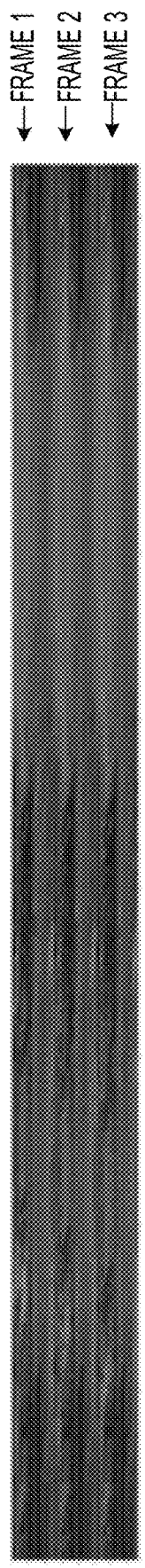
FIG. 19 shows an intensity image of a larger frame that is formed of stacking three consecutive frames vertically.

FIG. 18 shows a distance image having distance values of a larger frame that is formed of stacking three consecutive frames vertically; and FIG. 19 shows an intensity image having intensity values of the larger frame that is formed of stacking three consecutive frames vertically.

As shown in FIG. 18 and FIG. 19, strong correlation may exist among the consecutive frames. Thus, in some embodiments, compression techniques that utilize inter frame correlation can achieve better compression efficiency.

In some embodiments, each frame (having both distance and intensity values) can be treated as a combined color image in YUV. For example, for a pixel, the Y value is the distance (Y=d), the U value is the intensity (U=i) and the V value can be a constant, such as V=128 for all pixels. In some examples, d is often represented as a 16-bit integer and i is often represented as an 8-bit integer. In an embodiment, the 16-bit integer d can be split into two bytes byte0 and byte1: byte1=$b_{15}b_{14}b_{13}b_{12}b_{11}b_{10}b_9b_8$, byte0=$b_7b_6b_5b_4b_3b_2b_1b_0$, where $b_{15}$, $b_0$ are respectively the most significant and least significant bit of d. Then, a frame can be treated as a color image with one of four possible configurations:

Y=byte1, U=byte0, V=i
Y=byte0, U=byte1, V=i
Y=U=byte1, V=byte0
Y=U=byte0, V=byte1

For monochrome images or color images, two compression methods that are referred to as image compression and video compression can be utilized.

For image Compression, in some embodiments, image compression codec, such as JPEG, JPEG2000 can be used for lossy image compression while JPEG-LS or FFV1 encoder as included in the popular ffmpeg software package can be used for lossless image compression.

Thus, in an example in which some distortions to the distance or intensity information can be tolerated, JPEG, JPEG2000 can be used to compress the distance image, intensity image or the combined color image. In another example in which lossless compression is required, JPEG-LS or FFV1 encoder can be used.

It is noted that besides the image compression codec mentioned above, any other suitable image compression codec can be used to compress the images derived from the Lidar raw data.

For video compression, as mentioned above, in some embodiments, a sequence of Lidar raw data frames is generated for continuously operating Lidar. Thus, a sequence of distance images, intensity image or combined color images can be generated. In addition, temporally adjacent images are often correlated. Thus video compression codec can be utilized to compress distance videos, intensity video or combined color videos.

Among many video codecs, H264 and H265 codec can be used as examples to illustrate the idea. In some embodiments, lossless or lossy compression configuration may depend on quality requirement, H264 and H265 can be configured as lossless compression or lossy compression based on the quality requirement.

In some embodiments, random access requirement can be used to determine whether to select one of an all intra configuration, a low delay configuration and a random access configuration.

For the all intra configuration, all images are compressed separately without utilizing the information from adjacent images. Thus, any image can be decoded separately without relying on decoding of other images.

For the low delay configuration, decoding of one image may need decoding of one or multiple images appeared before the current image in time.

For random access configuration, decoding of one image may need decoding of one or multiple images appeared before or after the current image in time. This configuration often provides better compression efficiency.

In addition, a video codec that can deal with 360-degree content is preferred in general, as a 360-degree video codec is able to better handle the distortion when mapping 3D polar to 2D Cartesian coordinates and provide more efficient prediction across 2D boundaries.

In some embodiments, the set of rotation angles $[\varphi^{(1)}, \varphi^{(2)}, \ldots, \varphi^{(M)}]$ may not be exactly the same for different Lidar raw frames, the rotation angles can be compressed with the Lidar raw data in the raw data bistream. In some examples, the rotation angles can be carried with the Lidar raw data for each frame. For illustration, a short sequence of the rotation angles from a Lidar raw data: {18072, 18090, 18099, 18117, 18135, 18153, 18171, 18189, 18207, 18225, 18243, 18261, 18279, 18297, 18315, 18324} is used as an example. In the example, each angle is represented in term of 0.01 degree. For example, 18072 is used to denote the rotation angle of 180.72 degree.

In an embodiment, the difference between the adjacent rotation angles, i.e., $\varphi^{(2)}-\varphi^{(1)}, \varphi^{(3)}-\varphi^{(2)} \ldots, \varphi^{(M)}-\varphi^{(M-1)}$ often takes values from a small subset, denoted $\{\delta_0, \ldots, \delta_{S-1}\}$ where S is often a small number. The differences in the small subset can be ordered in decreasing probability of occurrence, i.e., $\delta_0$ will appear most frequently. Using the short sequence example, S=2, the set of angle difference is {18, 9} where the angle difference 18 appears much more frequently than the angle difference 9. Thus, for each frame, $\varphi^{(1)}$ can be sent using fixed-length coding, then followed by a set of index values s(m) for $\delta_{s(m)}=\varphi^{(m+1)}-\varphi^{(m)}$, for m=1, ..., M−1.

It is noted that s(m), m=1, ..., M−1 can be binarized into binary bins using truncated unary code. For example, first one or the first two bins are coded as adaptive bins using binary arithmetic code, and the rest of bins are coded as bypass coding mode.

It is noted that the table $\{\delta_0, \ldots, \delta_{L-1}\}$ can be sent in several ways. In an example, the table $\{\delta_0, \ldots, \delta_{L-1}\}$ can be sent in each frame. In another example, the table $\{\delta_0, \ldots, \delta_{L-1}\}$ is sent once for a sequence of frames if the table is the same for all the frames in the sequence. To code the table $\{\delta_0, \ldots, \delta_{L-1}\}$, in an embodiment, fixed-length coding is used for all the elements in the table. In another embodiment, the first element $\delta_0$ is coded using fixed length coding, and the difference $\delta_l-\delta_{l-1}$ for l=1, ..., L−1 can be coded using fixed length coding with possible different length. It is noted that the length for fixed length coding method mentioned above can be determined by different application and may be different for $\varphi^{(1)}$ and $\delta_0$.

Some aspects of the disclosure are related to the associated meta data that can be used to convert Lidar raw data into final point cloud and compression of the meta data.

In some embodiments, the associated meta data includes elevation angles, such as a set of elevation angles $[\theta_1, \theta_2, \ldots, \theta_N]$ for an N-ray Lidar sensor.

The associated meta data also includes meta data related to calibration. Different Lidar manufactures may have different kinds of calibration meta data.

FIG. 20 shows Table 4 for an example set of calibration meta data. In some examples, for some particular Lidar, 64 lasers are included and are divided into 2 blocks, i.e., upper block and lower block, each with 32 lasers. For an N-ray Lidar, N sets of calibration meta data parameters can be included. Some of the parameters are shown in Table 4.

The associated meta data also includes meta data related to motion compensation. When a Lidar sensor is installed on moving vehicles, motion compensation is needed to align all the points from the Lidar raw data into a common coordinate, such as the local coordinate of that Lidar sensor at the last rotation angle in a frame, i.e., at the rotation angle, $\varphi^{(M)}$. To achieve this, the sensor position and the orientation at each rotation angle in a frame may be needed.

In some examples, GPS, Inertial measurement unit (IMU), odometry sensor, or cameras are used to obtain the position and orientation of the Lidar sensor at certain time interval. For convenience, the position and the orientation of a Lidar sensor at time t are denoted as $[T_x(t), T_y(t), T_z(t)]$ and $[\alpha(t), \beta(t), \gamma(t)]$, respectively, both reference to an initial coordinate frame. It is noted that, in an example, the orientation can be described using Euler angles such as yaw, roll, and pitch angles. In another example, unit quaternion, i.e., $[q_0(t), q_1(t), q_2(t), q_3(t)]$ is used to represent the orientation of the Lidar sensor at time t.

Thus, in some embodiments, the meta data for the motion compensation is a sequence of the following parameters: $\text{Meta}_{MotionComp}(t)=\{[T_x(t), T_y(t), T_z(t)], [\alpha(t), \beta(t), \gamma(t)]\}$, where t takes values from the discrete time set $[t_0, t_1, \ldots,$ $t_Q$], where [$t_0$, $t_Q$] cover the time range when the Lidar is operating and $t_q < t_{q+1}$ for q=0, . . . , Q−1.

The compression of the associated meta data can include compression of elevation angles, compression of meta data related to calibration and compression of meta data related to motion compensation.

In an embodiment for compression of elevation angles, for the set of elevation angles [$\theta_1$, $\theta_2$, . . . , $\theta_N$], each angle is represented using a 4-byte floating number or a two-byte floating number depending on precision requirement, and then the angles are transmitted directly in the bit stream without compression.

In another embodiment, if the elevation angles [$\theta_1$, $\theta_2$, . . . , $\theta_N$] have been sorted such that $\theta_n < \theta_{n+1}$ for n=1, . . . , N−1, the angles can be quantized to a set of integers [$\Theta_1$, $\Theta_2$, . . . , $\Theta_N$] where $\Theta_n$=int ($C_\Theta \times \theta_n$+0.5), $C_\Theta$ is a pre-defined constant chosen to satisfy the precision requirement. Thus, in an example, $\Theta_1$, and $\Delta_n = \Theta_n - \Theta_{n-1}$ for n=2, N can be sent with a pre-defined bit depth in the bitstream. It is noted that the bit-depth for $\Delta_n$ is in general smaller than that of $\Theta_n$ due to smaller dynamic range, thus saving bits to achieve compression.

In an embodiment for compression of meta data related to calibration, similar to elevation angles, the N set of calibration data for an N-ray Lidar sensor, denoted as $\text{Meta}_{calibration}$ (i), i=1, . . . , N can be sent with their native representation in the bitstream without compression. The reason is that this set of meta data can be shared by all frames of the Lidar raw data. The overhead is not significant.

In another embodiment, one set of calibration data for the first laser ray, $\text{Meta}_{calibration}(1)$ can be sent using the native representation, and then the delta of the calibration data for the rest of laser rays, i.e, $\Delta\text{Meta}_{calibration}(n) = \text{Meta}_{calibration}(n) - \text{Meta}_{calibration}(n-1)$, for n=2, . . . , N, can be sent. Since $\Delta\text{Meta}_{calibration}(n)$ is in general has smaller dynamic range that that of $\text{Meta}_{calibration}(n)$, thus a smaller number of bits can be used to represent them. In this way, compression can be achieved.

In an embodiment for compression of meta data related to motion compensation, similar to elevation angles, $\text{Meta}_{MotionComp}$ (t) for t in [$t_0$, $t_1$, . . . , $t_Q$] can be sent using their native representation in the bitstreams without compression.

In another embodiment, $\text{Meta}_{MotionComp}(t_0)$ is sent using its native representation and the delta information, ie., $\Delta\text{Meta}_{MotionComp}(t_q) = \text{Meta}_{calibration}(t_q) - \text{Meta}_{calibration}(t_{q-1})$, for q=1, can be sent. Since $\Delta\text{Meta}_{MotioComp}$ (n) is in general has smaller dynamic range than that of $\text{Meta}_{MotioComp}$ (n), thus a smaller number of bits may be used to represent them. In this way, compression can be achieved.

Based on Lidar raw data and the associated meta data, final point cloud can be constructed. Any suitable techniques can be used.

Some aspects of the disclosure provide techniques to compress point cloud (e.g., final point cloud in Cartesian coordinate system) using 3D polar coordinate system. Some techniques can be used to compress point cloud with Lidar raw data information; and some techniques can be used to compress point cloud without Lidar raw data information In some embodiments, point cloud with Lidar raw data information can be compressed using 3D polar coordinate system. In some examples, the final point cloud (e.g., constructed based on Lidar raw data, calibration and motion compensation) and the original Lidar raw data information are available. The final point cloud can be directly compressed in 3D polar coordinate system. In an example that the final point cloud is represented in Cartesian coordinate, the final point cloud can be converted into 3D polar coordinate system. For example, a point in a point cloud can be represented as polar coordinate (d, rp, $\theta$) and attribute (i) where d denotes the distance and i denotes the intensity.

FIG. 21 shows Table 5 of a point cloud from Lidar in 2D matrix of dimension N×M. In some examples, the Lidar raw data can be represented as a 2D matrix and each entry ($d_{n,m}$, $i_{n,m}$) in the matrix can be referred by a pair of angles, i.e., elevation angles $\theta_n$ and rotation angle $\varphi^{(m)}$. The final point cloud points are obtained through calibration and motion compensation, which can be considered as modification of ($\theta_n$, $\varphi^{(m)}$, $d_{n,m}$, $i_{n,m}$) tuple and the modified tuple is denoted as ($\theta_{n,m}$, $\varphi_{n,m}$, $d'_{n,m}$ $i'_{n,m}$). It is noted that, in an example, $i_{n,m}$ may also be modified through calibration. In some embodiments, differences are used. For examples, elevation angle difference can be denoted by $\delta\theta_{n,m} = \theta_{n,m} - \theta_n$ and rotation angle difference can be denoted by $\delta\varphi_{n,m} = \varphi^{(m)}$. Then, the final point cloud can be represented as a 2D matrix shown in Table 5.

In some examples, the point cloud compression operation can include the several sub-operations, such as a compression of the set of elevation angles [$\theta_1$, $\theta_2$, . . . , $\theta_N$] (e.g., described above), a compression of the set of rotation angles [$\varphi^{(1)}$, $\varphi^{(2)}$, . . . , $\varphi^{(M)}$] (e.g., described above), a compression of the 2D matrix {($\delta\theta_{n,m}$, $\delta\varphi_{n,m}$, $d'_{n,m}$)} for n=1, . . . , n and m=1, . . . , M.

In an embodiment, the 2D matrix is compressed using K-D tree. In another embodiment, the 2D matrix is compressed using image or video compression. In some examples, the 2D matrix is treated as four separate images, i.e., {$\delta\theta_{n,m}$}, {$\delta\varphi_{n,m}$}, {$i'_{n,m}$}. In some other examples, {($\delta\theta_{n,m}$, $\delta\varphi_{n,m}$, $d'_{n,m}$)} can be treated as a YUV image, where $d'_{n,m}$ is the Y component and $\delta\theta_{n,m}$, $\delta\varphi_{n,m}$ are the U, V component, and {$i'_{n,m}$} is treated as another image. Then, the different types of images can be compressed separately using the image compression or video compression techniques mentioned above.

In the embodiments that compress the final point cloud in the 3D polar coordinate system, meta data related to calibration and motion compensation are not needed and the operations of calibration and motion compensation to convert the Lidar raw data into final point cloud are not needed. This approach requires compression of a 2D matrix with each entry as a 4-tuple ($\delta\theta_{n,m}$, $\delta\varphi_{n,m}$, $d'_{n,m}$, $i'_{n,m}$) while the approach that compresses the Lidar raw data only requires compression of a 2dD matrix with each entry as a 2-tuple ($d_{n,m}$, $i_{n,m}$).

In some embodiments, point cloud (final point cloud) without Lidar raw data information can be compressed using 3D polar coordinate system. In this case, the final point cloud usually is represented in Cartesian coordinate {$x_k$, $y_k$, $z_k$} for k=1, . . . , K, where K is number of points in the point cloud, and the associate attribute vector, for simplicity, assume only intensity {$i_k$} for k=1, . . . , K.

It is noted that the final point cloud often doesn't contain all the points captured by the Lidar sensor since distance measurement from Lidar sensor is not reliable for small distance or for large distance are not reliable and the corresponding points are often dropped when generating the final point cloud.

To compress the point cloud in 3D polar coordinate system, four major steps can be performed.

In a first step, the Cartesian coordinate {$x_k$, $y_k$, $z_k$} can be converted to polar coordinate ($\theta_k$, $\varphi_k$, $d_k$) for k=1, . . . , K.

In a second step, the polar coordinate ($\theta_k$, $\varphi_k$, $d_k$) is quantized to integer with predefined precision by multiplying by a predefined scalar and taking rounding operations, for k=1, . . . , K In a third step, $\{(\theta_k, \varphi_k)\}$ can be compressed using quadtree. In some examples, this step can be performed similarly to the concept of octree for point cloud compression.

Specifically, in an example, the point $P_{min}=\{(\theta_{min}, \varphi_{min})\}$ where $\theta_{min}<=\theta_k$, $\varphi_{min}<=\varphi_k$ for k=1, . . . , N can be found. Then, $\{(\theta_k, \varphi_k)\}$ can be shifted by moving the point $P_{min}$ to the origin to obtain $\{(\theta'_k, \varphi'_k)\}$ where $\theta'_k=\theta_k-\theta_{min}$, $\varphi'_k=\varphi_k-\varphi_{min}$ for k=1, . . . , K. Further, the bounding box in $\{(\theta'_k, \varphi'_k)\}$ can be found. For example, $\theta'_{max}$ and $\varphi'_{max}$ can be determined where $\theta'_{max}>=\theta'_k$, $\varphi'_{max}<=\varphi'_k$ for k=1, . . . , N. The bound box includes the four points $\{(0,0), (0, \varphi'_{max}), (\theta'_{max}, 0), (\theta'_{max}, \varphi'_{max})\}$. In some examples, for simplicity, a square bound box is chosen $\{(0,0), (0, b_{max}), (b_{max}, 0), (b_{max}, b_{max})\}$ where $b_{max}>=\theta'_{max}$, $b_{max}>=\theta'_{max}$ is often chosen as 2 to integer power.

Further, the bound box is partitioned into 4 quadrants. If there is at least one point in a quadrant, the corresponding occupancy flag is 1, otherwise the occupancy flag is 0, thus 4-bit occupancy code can be obtained after one partition. The occupied quadrants can be further partitioned until unit square where each side is 1 is reached. The 4-bit occupancy code can be encoded using binary or non-binary arithmetic code with context adaptation.

It is noted that in a unit square, multiple points with same coordinate may exist. I some embodiments, the information of all the points in the unit square can be merged for one point. In an example, the distance values and attribute values are respectively averaged to form the distance and attribute of the merged point. In some examples, when a quadrant contains a small number of points, e.g., 2, the partition can be stopped and the coordinate information of these points can be coded. For simplicity, this mode is referred to as direct mode. In an embodiment, a flag at frame level or sequence level is used to indicate whether direct mode is allowed. At a leaf node of the quad-tree partition, a flag is used in indicate whether direct mode is on. In some examples, the flag can be omitted by introducing a condition when the direct mode may be chosen and only under that condition. The condition is often chosen based on neighbor node occupancy situation.

In a fourth step, the distance $\{d_k\}$ and attribute information $\{i_k\}$ can be compressed. In some examples, prediction from neighboring points in $\{(\theta_k, \varphi_k)\}$ plane can be chosen and only the differences of the distance value and attribute value to their corresponding predictor are encoded. In some examples, a 2D region adaptive hierarchical transform (RAHT) can be used to encode the distance information and the attribute information.

Figure 22:
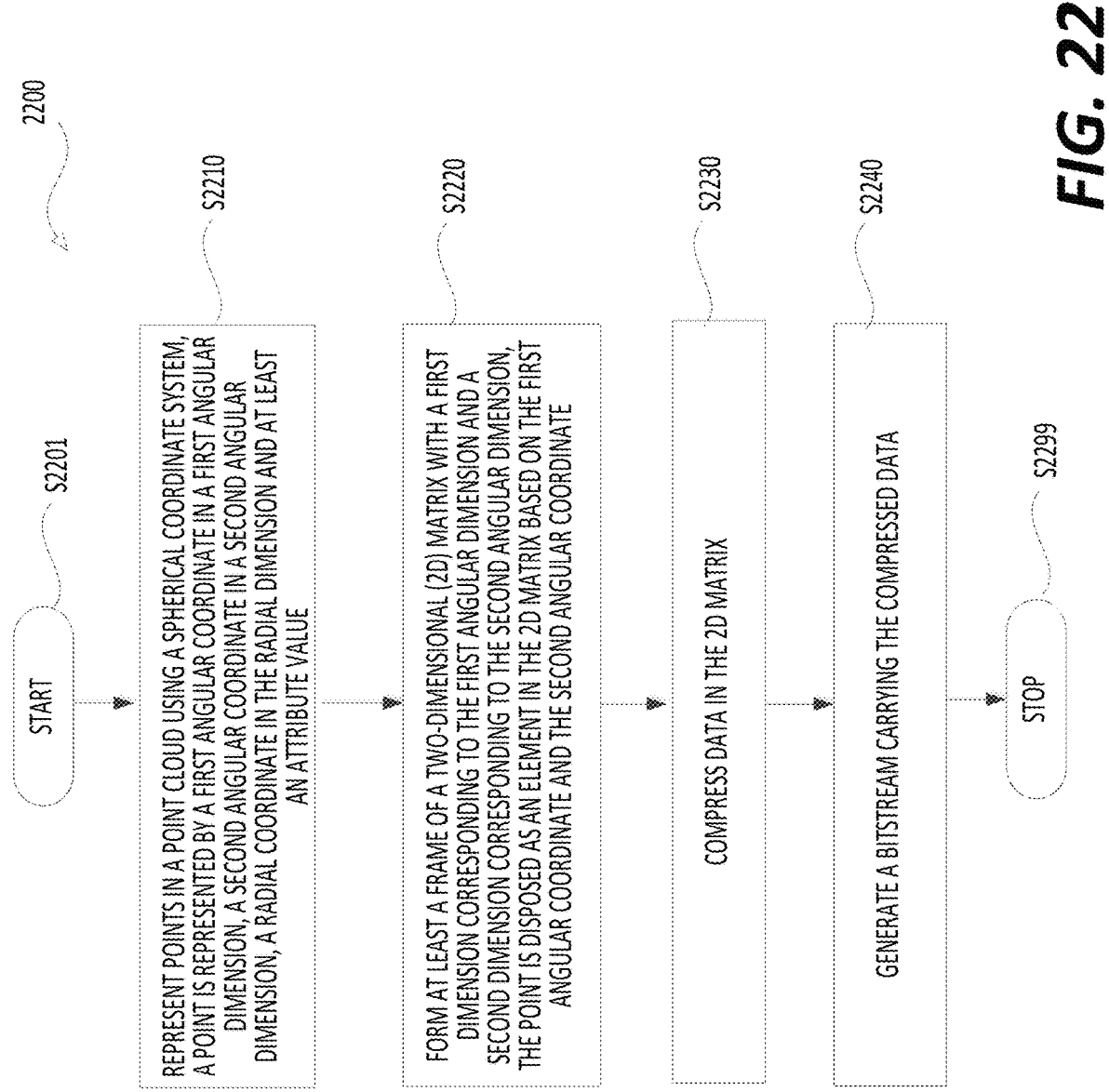
FIG. 22 shows a flow chart outlining a process example in accordance with some embodiments.

FIG. 22 shows a flow chart outlining a process (2200) according to an embodiment of the disclosure. The process (2200) can be used during an encoding process for encoding point clouds. In various embodiments, the process (2200) is executed by processing circuitry, such as the processing circuitry in the terminal devices (110), the processing circuitry that performs functions of the encoder (203), the processing circuitry that performs functions of the encoder (300), and the like. In some embodiments, the process (2200) is implemented in software instructions, thus when the processing circuitry executes the software instructions, the processing circuitry performs the process (2200). The process starts at (S2201) and proceeds to (S2210).

At (S2210), points in a point cloud are represented using a spherical coordinate system. The spherical coordinate system uses a first angular dimension, a second angular dimension and a radial dimension, thus each point can be represented by a first angular coordinate in a first angular dimension, a second angular coordinate in a second angular dimension, a radial coordinate in the radial dimension and at least an attribute value.

In some embodiments, distances and intensities that are sensed by a Lidar sensor based on lasers that are disposed at elevation angles and rotate to rotation angles with time can be received. A distance and an intensity are sensed in response to a ray emitted by a laser disposed at an elevation angle and at a time having a rotation angle. A point can be represented by the rotation angle in the first angular dimension, the elevation angle in the second angular dimension, the distance in the radial dimension and the intensity is the attribute value.

At (S2220), at least a frame of a two-dimensional (2D) matrix is formed. The 2D matrix has a first dimension corresponding to the first angular dimension and a second dimension corresponding to the second angular dimension. A point can be placed as an element in the 2D matrix based on the first angular coordinate and the second angular coordinate of the point. In the example of LIDAR, the point can be placed as the element in the 2D matrix based on the rotation angle and the elevation angle.

At (S2230), data of the 2D matrix is compressed. In some examples, the 2D matrix is converted to one or more images.

At (S2240), a bitstream that carries the compressed data of the 2D matrix is generated. In some examples, the one or more images can be compressed using any suitable image compression and video compression techniques. Then, the process proceeds to (S2299) and terminates.

Figure 23:
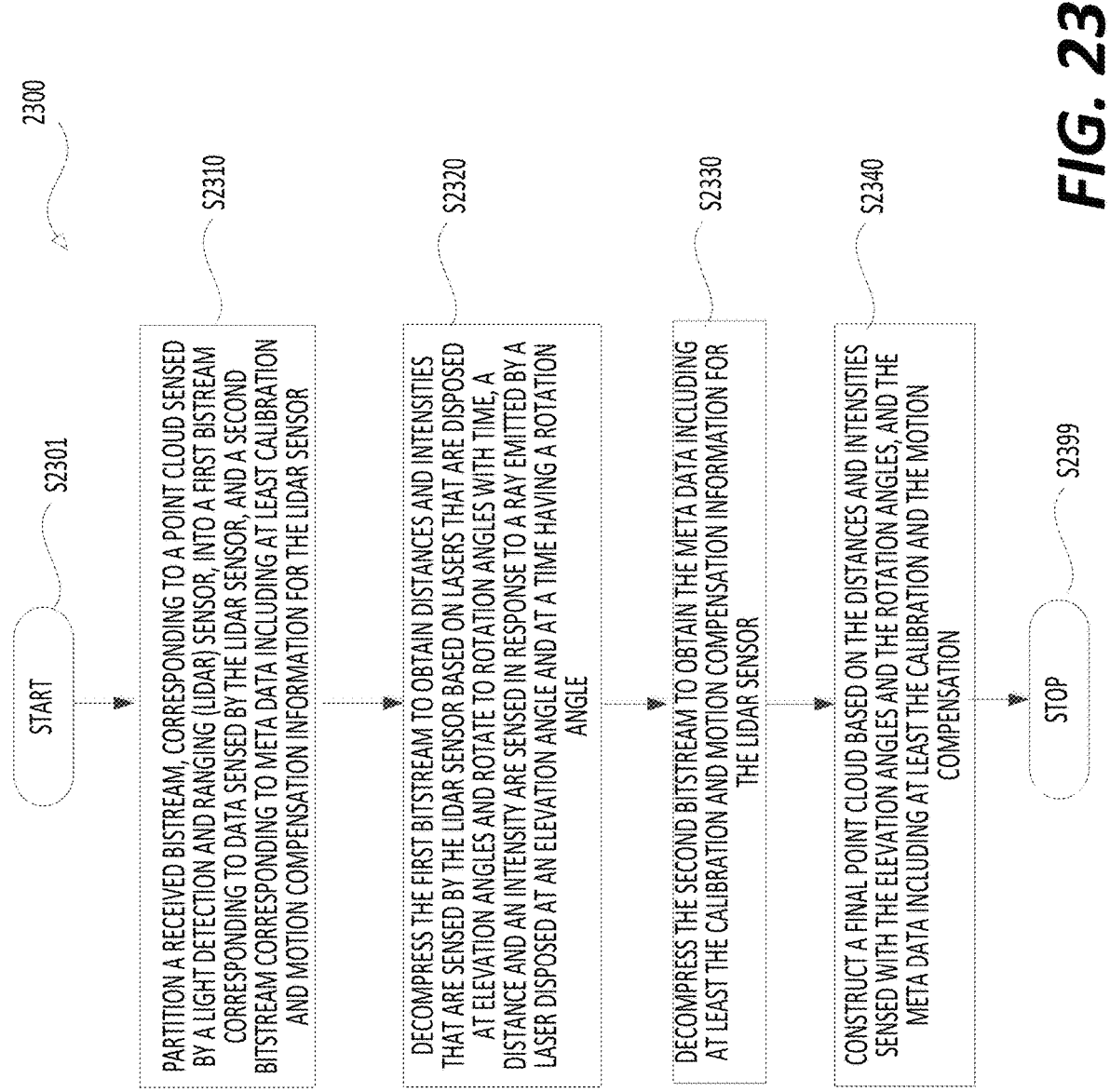
FIG. 23 shows a flow chart outlining a process example in accordance with some embodiments.

FIG. 23 shows a flow chart outlining a process (2300) according to an embodiment of the disclosure. The process (2300) can be used during an decoding process for constructing point clouds. In various embodiments, the process (2300) is executed by processing circuitry. The process starts at (S2301) and proceeds to (S2310).

At (S2310), a received bistream, corresponding to a point cloud sensed by a light detection and ranging (Lidar) sensor, is partitioned into a first bistream corresponding to data sensed by the Lidar sensor, and a second bitstream corresponding to meta data including at least calibration and motion compensation information for the Lidar sensor.

At (S2320), the first bitstream is decompressed to obtain distances and intensities that are sensed by the Lidar sensor based on lasers that are disposed at elevation angles and rotate to rotation angles with time. A distance and an intensity are sensed in response to a ray emitted by a laser disposed at an elevation angle and at a time having a rotation angle.

At (S2330), the second bitstream is decompressed to obtain the meta data including at least the calibration and motion compensation information for the Lidar sensor At (S2340), a final point cloud is constructed based on the distances and intensities sensed with the elevation angles and the rotation angles, and the meta data including at least the calibration and the motion compensation. Then, the process proceeds to (S2399) and terminates.

The techniques described above, can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
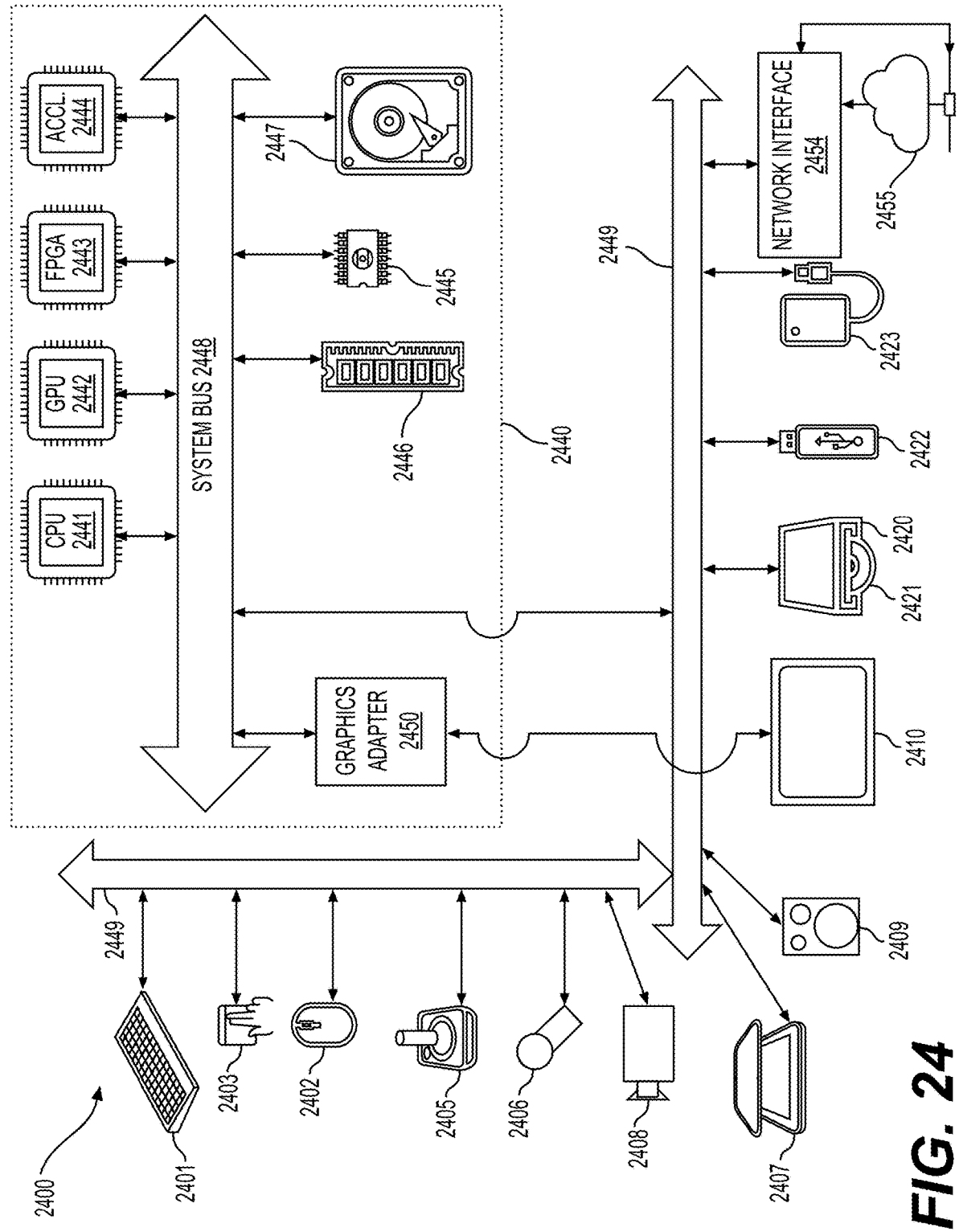
FIG. 24 is a schematic illustration of a computer system in accordance with an embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2401), mouse (2402), trackpad (2403), touch screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as screens (2410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2449) (such as, for example USB ports of the computer system (2400)); others are commonly integrated into the core of the computer system (2400) by attachment to a system bus as described below (for example Ethernet interface into a PC computer system or cellular network interface into a smartphone computer system). Using any of these networks, computer system (2400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators for certain tasks (2444), and so forth. These devices, along with Read-only memory (ROM) (2445), Random-access memory (2446), internal mass storage such as internal non-user accessible hard drives, SSDs, and the like (2447), may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). Architectures for a peripheral bus include PCI, USB, and the like.

CPUs (2441), GPUs (2442), FPGAs (2443), and accelerators (2444) can execute certain instructions that, in combination, can make up the aforementioned computer code. That computer code can be stored in ROM (2445) or RAM (2446). Transitional data can be also be stored in RAM (2446), whereas permanent data can be stored for example, in the internal mass storage (2447). Fast storage and retrieve to any of the memory devices can be enabled through the use of cache memory, that can be closely associated with one or more CPU (2441), GPU (2442), mass storage (2447), ROM (2445), RAM (2446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2400), and specifically the core (2440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2440) that are of non-transitory nature, such as core-internal mass storage (2447) or ROM (2445). The software implementing various embodiments of the present disclosure can be stored in such devices and executed by core (2440). A computer-readable medium can include one or more memory devices or chips, according to particular needs. The software can cause the core (2440) and specifically the processors therein (including CPU, GPU, FPGA, and the like) to execute particular processes or particular parts of particular processes described herein, including defining data structures stored in RAM (2446) and modifying such data structures according to the processes defined by the software. In addition or as an alternative, the computer system can provide functionality as a result of logic hardwired or otherwise embodied in a circuit (for example: accelerator (2444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for point cloud encoding in an encoder, comprising:
    representing, by a processor, points in a point cloud using a spherical coordinate system having a first angular dimension, a second angular dimension and a radial dimension, a point being represented by a first angular coordinate in the first angular dimension, a second angular coordinate in the second angular dimension, a radial coordinate in the radial dimension and at least an attribute value;
    forming, by the processor, at least a two-dimensional (2D) matrix with a first dimension corresponding to the first angular dimension and a second dimension corresponding to the second angular dimension, the point being placed as an element in the 2D matrix based on the first angular coordinate and the second angular coordinate;
    compressing, by the processor, data of the 2D matrix; and
    generating, by the processor, a bitstream that includes compressed data of the 2D matrix.

2. The method of claim 1, further comprising:
    receiving distances and intensities that are sensed by a light detection and ranging (Lidar) sensor based on lasers that are disposed at elevation angles and rotate to rotation angles with time, a distance and an intensity being sensed in response to a ray emitted by a laser disposed at an elevation angle and at a time having a rotation angle;
    representing the point by the rotation angle in the first angular dimension, the elevation angle in the second angular dimension, the distance in the radial dimension and the intensity being the attribute value;
    placing the point as the element in the 2D matrix based on the rotation angle and the elevation angle;
    converting the 2D matrix to one or more images; and
    compressing the one or more images.

3. The method of claim 2, further comprising:
    converting the 2D matrix to a first 2D image and a second 2D image, the first 2D image having pixel values corresponding to distances of points in the 2D matrix, the second 2D image having pixel values corresponding to intensities of the points in the 2D matrix; and
    compressing the first 2D image and the second 2D image.

4. The method of claim 2, further comprising:
    converting the 2D matrix to a 2D image with a pixel in the 2D image corresponding to the point, the pixel having a pixel color with the distance of the point being a first color component, and with the intensity of the point being a second color component; and
    compressing the 2D image.

5. The method of claim 2, wherein the 2D matrix is a first frame of 2D matrix corresponding to a full rotation, and the method further comprises:
    forming at least a second frame of 2D matrix corresponding to another full rotation with a temporal difference to the first frame;
    stacking the at least second frame of 2D matrix with the first frame of 2D matrix into a multi frame matrix;
    converting the multi frame matrix to one or more images; and
    compressing the one or more images.

6. The method of claim 2, further comprising:
    forming a sequence of frames of 2D matrix that respectively correspond to different time;
    generating, from the sequence of frames, a sequence of images that respectively correspond to the different time;
    compressing the sequence of images respectively based on image compression.

7. The method of claim 2, further comprising:
    forming a sequence of frames of 2D matrix that respectively correspond to different time;
    generating, from the sequence of frames, a sequence of images that respectively correspond to the different time; and
    compressing the sequence of images based on video compression.

8. The method of claim 2, further comprising:
    associating a set of rotation angels in the first angular dimension with the 2D matrix.

9. The method of claim 2, further comprising:
    generating a first bistream including compressed data for the one or more images;
    generating a second bitstream including compressed calibration and motion compensation for the Lidar sensor; and
    combining the first bitstream and the second bitstream into a combined bitstream.

10. The method of claim 2, further comprising:
    modifying points in the 2D matrix based on calibration and motion compensation, a modified point in the 2D matrix including a rotation angle adjustment, an elevation angle adjustment, a modified distance and a modified intensity;
    converting the 2D matrix to one or more images; and
    compressing the one or more images.

11. An apparatus for point cloud encoding, comprising:
processing circuitry configured to:
represent points in a point cloud using a spherical coordinate system having a first angular dimension, a second angular dimension and a radial dimension, a point being represented by a first angular coordinate in the first angular dimension, a second angular coordinate in the second angular dimension, a radial coordinate in the radial dimension and at least an attribute value;
form at least a two-dimensional (2D) matrix with a first dimension corresponding to the first angular dimension and a second dimension corresponding to the second angular dimension, the point being placed as an element in the 2D matrix based on the first angular coordinate and the second angular coordinate;
compress data of the 2D matrix; and
generate a bitstream that includes compressed data of the 2D matrix.

12. The apparatus of claim 11, wherein the processing circuitry is configured to:
receive distances and intensities that are sensed by a light detection and ranging (Lidar) sensor based on lasers that are disposed at elevation angles and rotate to rotation angles with time, a distance and an intensity being sensed in response to a ray emitted by a laser disposed at an elevation angle and at a time having a rotation angle;
represent the point by the rotation angle in the first angular dimension, the elevation angle in the second angular dimension, the distance in the radial dimension and the intensity being the attribute value;
place the point as the element in the 2D matrix based on the rotation angle and the elevation angle;
convert the 2D matrix to one or more images; and
compress the one or more images.

13. The apparatus of claim 12, wherein the processing circuitry is configured to:
convert the 2D matrix to a first 2D image and a second 2D image, the first 2D image having pixel values corresponding to distances of points in the 2D matrix, the second 2D image having pixel values corresponding to intensities of the points in the 2D matrix; and
compress the first 2D image and the second 2D image.

14. The apparatus of claim 12, wherein the processing circuitry is configured to:
convert the 2D matrix to a 2D image with a pixel in the 2D image corresponding to the point, the pixel having a pixel color with the distance of the point being a first color component, and with the intensity of the point being a second color component; and
compress the 2D image.

15. The apparatus of claim 12, wherein the 2D matrix is a first frame of 2D matrix corresponding to a full rotation, and the processing circuitry is configured to:
form at least a second frame of 2D matrix corresponding to another full rotation with a temporal difference to the first frame;
stack the at least second frame of 2D matrix with the first frame of 2D matrix into a multi frame matrix;
convert the multi frame matrix to one or more images; and
compress the one or more images.

16. The apparatus of claim 12, wherein the processing circuitry is configured to:
form a sequence of frames of 2D matrix that respectively correspond to different time;
generate, from the sequence of frames, a sequence of images that respectively correspond to the different time;
compress the sequence of images respectively based on image compression.

17. The apparatus of claim 12, wherein the processing circuitry is configured to:
form a sequence of frames of 2D matrix that respectively correspond to different time;
generate, from the sequence of frames, a sequence of images that respectively correspond to the different time; and
compress the sequence of images based on video compression.

18. The apparatus of claim 12, wherein the processing circuitry is configured to:
generate a first bistream including compressed data for the one or more images;
generate a second bitstream including compressed calibration and motion compensation for the Lidar sensor; and
combine the first bitstream and the second bitstream into a combined bitstream.

19. The apparatus of claim 12, wherein the processing circuitry is configured to:
modify points in the 2D matrix based on calibration and motion compensation, a modified point in the 2D matrix including a rotation angle adjustment, an elevation angle adjustment, a modified distance and a modified intensity;
convert the 2D matrix to one or more images; and
compress the one or more images.

20. A method for point cloud construction, comprising:
partitioning, by a processor, a received bistream, corresponding to a point cloud sensed by a light detection and ranging (Lidar) sensor, into a first bistream corresponding to data sensed by the Lidar sensor, and a second bitstream corresponding to meta data including at least calibration and motion compensation information for the Lidar sensor;
decompressing, by the processor, the first bitstream to obtain distances and intensities that are sensed by the Lidar sensor based on lasers that are disposed at elevation angles and rotate to rotation angles with time, a distance and an intensity being sensed in response to a ray emitted by a laser disposed at an elevation angle and at a time having a rotation angle;
decompressing, by the processor, the second bitstream to obtain the meta data including at least the calibration and motion compensation information for the Lidar sensor; and
constructing, by the processor, a final point cloud based on the distances and intensities sensed with the elevation angles and the rotation angles, and the meta data including at least the calibration and the motion compensation.

* * * * *